United States Patent
Alder et al.

(10) Patent No.: US 11,128,926 B2
(45) Date of Patent: Sep. 21, 2021

(54) CLIENT DEVICE, COMPANION SCREEN DEVICE, AND OPERATION METHOD THEREFOR

(71) Applicant: SAMSUNG ELECTRONICS CO., LTD., Suwon-si (KR)

(72) Inventors: Christopher Alder, Staines (GB); Richard Moreton, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/639,234

(22) PCT Filed: Jul. 26, 2018

(86) PCT No.: PCT/KR2018/008475
§ 371 (c)(1),
(2) Date: Feb. 14, 2020

(87) PCT Pub. No.: WO2019/039748
PCT Pub. Date: Feb. 28, 2019

(65) Prior Publication Data
US 2020/0204870 A1 Jun. 25, 2020

(30) Foreign Application Priority Data

Aug. 23, 2017 (GB) .................................. 1713550
Jun. 22, 2018 (KR) ..................... 10-2018-0072347

(51) Int. Cl.
*H04N 7/16* (2011.01)
*H04N 21/485* (2011.01)
(Continued)

(52) U.S. Cl.
CPC ..... *H04N 21/4858* (2013.01); *H04N 21/4126* (2013.01); *H04N 21/4223* (2013.01); *H04N 21/4363* (2013.01); *H04N 21/816* (2013.01)

(58) Field of Classification Search
CPC ........... H04N 21/4858; H04N 21/4126; H04N 21/4223; H04N 21/4363; H04N 21/816;
(Continued)

(56) References Cited

U.S. PATENT DOCUMENTS 5,949,437 A * 9/1999 Clark .................... G06F 3/1431
345/1.1
6,088,004 A * 7/2000 Domae ................. G06F 3/1423
345/1.1
(Continued)

FOREIGN PATENT DOCUMENTS

CN 102244676 A 11/2011
CN 102346594 A 2/2012
(Continued)

OTHER PUBLICATIONS

HbbTV, "HbbTV 2.0.1 Specification", HbbTV Association, Apr. 12, 2016. (284 pages total).
(Continued)

*Primary Examiner* — Michael B. Pierorazio
(74) *Attorney, Agent, or Firm* — Sughrue Mion, PLLC

(57) ABSTRACT

According to embodiments, a client device, a companion screen device, and an operation method thereof are disclosed. The disclosed client device includes: a communication interface; a display; a memory configured to store one or more instructions; and a processor configured to execute the one or more instructions stored in the memory to control the display to display at least a part of 360-degree video content, identify a companion screen device having a 360-degree control capability to perform 360-degree control on the 360-degree video content, control the communication interface to connect a communication channel with the identified companion screen device, and control the display to control the displaying of the 360-degree video content (Continued)

according to a control command received from the connected companion screen device.

14 Claims, 18 Drawing Sheets

(51) Int. Cl.
*H04N 21/41* (2011.01)
*H04N 21/4223* (2011.01)
*H04N 21/4363* (2011.01)
*H04N 21/81* (2011.01)

(58) Field of Classification Search
CPC ............... H04N 21/218; H04N 21/422; H04N 21/42224; H04N 21/436; H04N 21/6587; H04N 21/41265; H04N 21/42208
See application file for complete search history.

(56) References Cited

U.S. PATENT DOCUMENTS

| | | | |
|---|---|---|---|
| 6,307,526 B1* | 10/2001 | Mann | H04N 5/2254 345/8 |
| 8,760,587 B2 | 6/2014 | Tian et al. | |
| 8,789,131 B2 | 7/2014 | Choi et al. | |
| 8,893,164 B1* | 11/2014 | Teller | H04N 21/2368 725/12 |
| 9,699,524 B2 | 7/2017 | Kang et al. | |
| 2002/0085843 A1* | 7/2002 | Mann | E03C 1/057 396/374 |
| 2005/0108092 A1* | 5/2005 | Campbell | G06Q 30/0267 705/14.64 |
| 2006/0256133 A1* | 11/2006 | Rosenberg | G06F 3/013 345/619 |
| 2007/0050253 A1* | 3/2007 | Biggs | G06Q 30/02 705/14.67 |
| 2010/0053555 A1* | 3/2010 | Enriquez | G02B 27/017 351/210 |
| 2010/0080418 A1* | 4/2010 | Ito | G06K 9/00335 382/103 |
| 2011/0161163 A1* | 6/2011 | Carlson | G06Q 30/0245 705/14.44 |
| 2012/0050478 A1* | 3/2012 | Karaoguz | H04N 13/111 348/46 |
| 2012/0075168 A1* | 3/2012 | Osterhout | G06F 3/011 345/8 |
| 2013/0194511 A1 | 8/2013 | Tian et al. | |
| 2014/0152544 A1 | 6/2014 | Ohta et al. | |
| 2014/0194164 A1 | 7/2014 | Lee et al. | |
| 2014/0270693 A1 | 9/2014 | Suzuki | |
| 2015/0245163 A1 | 8/2015 | Candelore | |
| 2015/0382080 A1 | 12/2015 | Kang et al. | |
| 2016/0241614 A1 | 8/2016 | Kang et al. | |
| 2016/0286128 A1 | 9/2016 | Zhou | |
| 2016/0366473 A1 | 12/2016 | Huang et al. | |
| 2017/0064374 A1 | 3/2017 | Eim et al. | |
| 2017/0085955 A1 | 3/2017 | Deshpande | |
| 2017/0150212 A1 | 5/2017 | Wang | |
| 2017/0155976 A1 | 6/2017 | Chung et al. | |
| 2017/0171592 A1 | 6/2017 | Cui | |
| 2018/0098131 A1* | 4/2018 | Zhou | H04N 21/6373 |
| 2019/0230142 A1* | 7/2019 | He | H04N 21/44218 |

FOREIGN PATENT DOCUMENTS

| | | |
|---|---|---|
| CN | 102833525 A | 12/2012 |
| CN | 105075274 A | 11/2015 |
| CN | 106028132 A | 10/2016 |
| CN | 106101741 A | 11/2016 |
| CN | 106210754 A | 12/2016 |
| CN | 106454401 A | 2/2017 |
| CN | 106454450 A | 2/2017 |
| CN | 106817625 A | 6/2017 |
| CN | 106982335 A | 7/2017 |
| EP | 3 242 472 A1 | 11/2017 |
| JP | 2005-56295 A | 3/2005 |
| JP | 2013-174864 A | 9/2013 |
| JP | 2014-183379 A | 9/2014 |
| KR | 10-2015-0140631 A | 12/2015 |
| KR | 10-2016-0051794 A | 5/2016 |
| KR | 10-2016-0147949 A | 12/2016 |
| KR | 10-1733057 B1 | 5/2017 |
| WO | 2014/189223 A1 | 11/2014 |

OTHER PUBLICATIONS

Technical Specification, "Hybrid Broadcast Broadband TV", ETSI TS 102 796, V1.4.1, Aug. 2016, EBU Operating Eurovision. (292 pages total).
Oipf, "Release 2 Specification—vol. 5—Declarative Application Environment", Open IPTV Forum, V2.3, Jan. 24, 2014. (415 pages total).
Wikipedia, "Zero-configuration networking", https://en.wikipedia.org/wiki/Zero-configuration_networking, last edited on Feb. 23, 2020, retrieved Feb. 27, 2020. (11 pages total).
International Search Report (PCT/ISA/210) and Written Opinion (PCT/ISA/237) dated Oct. 29, 2018 issued by the International Searching Authority in counterpart International Application No. PCT/KR2018/008475.
Communication dated Feb. 1, 2018 issued by the Great Britian Intellectual Property Office in counterpart Great Britian Patent Application No. GB1713550.0.
Communication dated Apr. 14, 2020 issued by the European Patent Office in European Application No. 18847978.6.
Communication dated Jul. 27, 2021, issued by the State Intellectual Property Office of P.R. China in counterpart Chinese Application No. 201880054658.7.

\* cited by examiner

FIG. 18
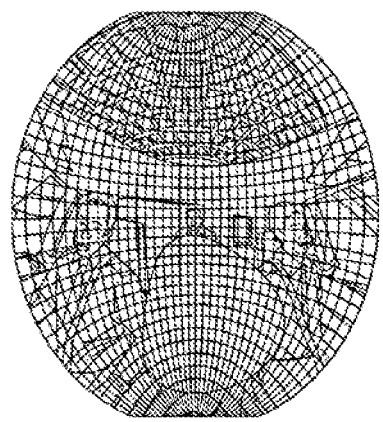
1800a
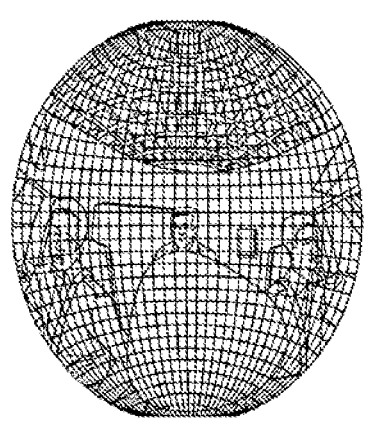
1800b
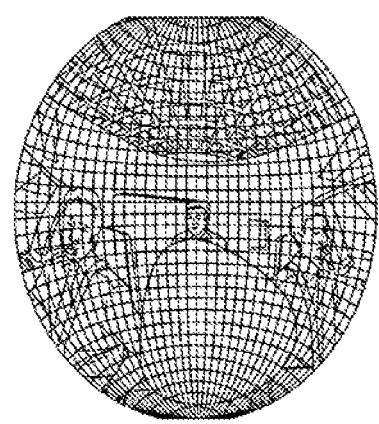
1800c
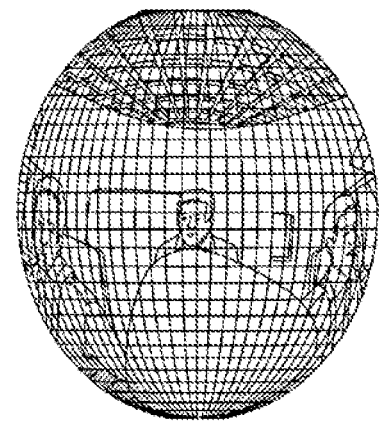
1800d

CLIENT DEVICE, COMPANION SCREEN DEVICE, AND OPERATION METHOD THEREFOR

TECHNICAL FIELD

Various embodiments relate to a client device, a companion screen device, and an operation method thereof, and more particularly, to a client device, a companion screen device, and an operation method thereof, so as to control 360-degree video content.

BACKGROUND ART

Image display apparatuses are apparatuses having a function of displaying an image that a user may watch. Users may watch broadcasting on image display apparatuses. Image display apparatuses display, on a display, a broadcast selected by a user among broadcast signals transmitted from broadcasting stations. Currently, broadcasting is shifting from analog broadcasting to digital broadcasting throughout the world.

Smart TVs providing a variety of content in addition to digital broadcasting functions are provided. Smart TVs do not aim to operate passively according to a selection of a user, but aim to analyze and provide what a user wants without an operation of a user.

A 360-degree image refers to an image in which views in all directions are simultaneously recorded by using an omnidirectional camera or a plurality of camera sets. A user may control the direction of view during reproduction of the 360-degree image.

Recently, users have been experiencing 360-degree images through various smart devices, such as smartphones, tablets, or PCs. In addition, smart TVs capable of reproducing 360-degree images are being developed.

DESCRIPTION OF EMBODIMENTS

Technical Problem

Various embodiments provide a client device, a companion screen device, and an operation method thereof, which are capable of controlling 360-degree video content more conveniently and effectively.

Solution to Problem

According to various embodiments, when reproducing 360-degree video content, a client device discovers and connects a companion screen device capable of controlling the 360-degree video content, and a companion screen device discovers and connects a client device capable of displaying the 360-degree video content, thereby providing the control of the 360-degree video content more conveniently and effectively.

Advantageous Effects of Disclosure

According to embodiments, 360-degree video content may be controlled more conveniently and efficiently.

BRIEF DESCRIPTION OF DRAWINGS

FIG. 18 illustrates different wide angle modes that may be selected by the client device 100 so as to render 360-degree video content, according to an embodiment.

BEST MODE

Figure 1:
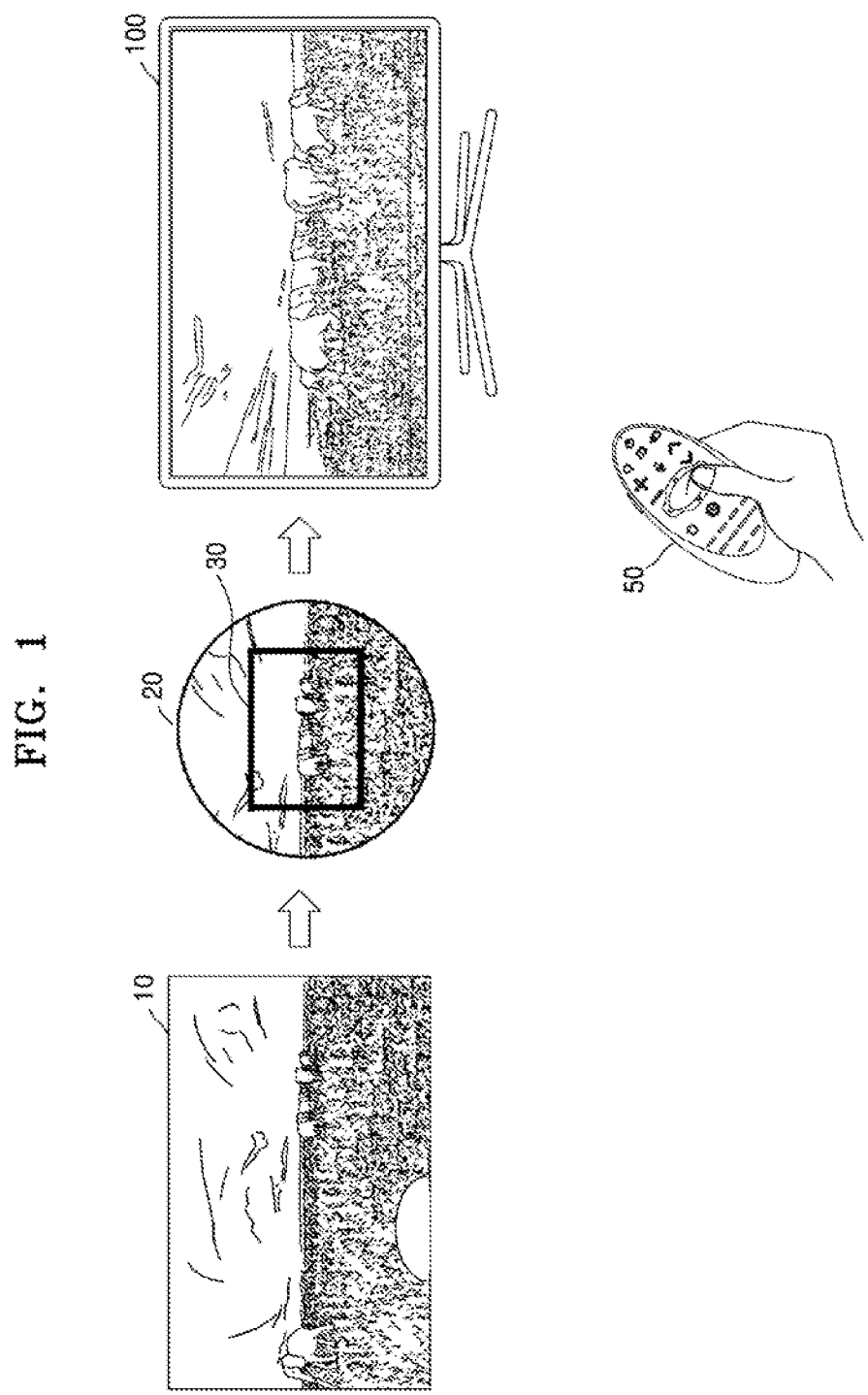
FIG. 1 is a diagram illustrating a client device 100 that displays a 360-degree image and a control device, according to an embodiment.

A client device according to an embodiment includes: a communication interface; a display; a memory configured to store one or more instructions; and a processor configured to execute the one or more instructions stored in the memory to control the display to display at least a part of 360-degree video content, identify a companion screen device having a 360-degree control capability to perform 360-degree control on the 360-degree video content, control the communication interface to connect a communication channel with the identified companion screen device, and control the display to control the displaying of the 360-degree video content according to a control command received from the connected companion screen device.

According to an embodiment, the processor may be further configured to execute the one or more instructions to request the identified companion screen device to execute an application that performs a control operation of displaying the 360-degree video content.

According to an embodiment, the processor may be further configured to execute the one or more instructions to transmit a request signal for discovering the companion screen device, and identify the companion screen device by receiving, from the companion screen device, a signal including information indicating that the companion screen device has the 360-degree control capability.

According to an embodiment, the processor may be further configured to execute the one or more instructions to receive, from a plurality of companion screen devices, a signal including information indicating that the plurality of companion screen devices have the 360-degree control capability, select at least one of the plurality of companion screen devices, and control the communication interface to connect with the selected at least one companion screen device.

According to an embodiment, the processor may be further configured to execute the one or more instructions to select at least one of the plurality of companion screen devices based on a user profile associated with the companion screen device.

According to an embodiment, the processor may be further configured to execute the one or more instructions to select at least one of the plurality of companion screen devices based on a proximity of the client device to each of the companion screen devices.

According to an embodiment, the processor may be further configured to execute the one or more instructions to select at least one of the plurality of companion screen devices based on a learning algorithm.

According to an embodiment, the processor may be further configured to execute the one or more instructions to receive device orientation information about an orientation of the companion screen device through the communication channel, adjust a point of view of the displayed 360-degree video content in response to the device orientation information such that the point of view of the displayed 360-degree video content is rotated according to the orientation of the companion screen device, and control the display to display an area of the 360-degree video content corresponding to the adjusted point of view.

According to an embodiment, the device orientation information may include a plurality of orientation values measured by one or more sensors arranged to detect the orientation of the companion screen device, and the processor may be further configured to execute the one or more instructions to smooth the plurality of orientation values so as to acquire smoothed orientation data and determine a rotation speed of the point of view of the 360-degree video content based on the smoothed orientation data.

A companion screen device according to an embodiment includes: a communication interface; a display; a memory configured to store one or more instructions; and a processor configured to execute the one or more instructions stored in the memory to identify a client device having a 360-degree video content-displaying capability, control the communication interface to connect a communication channel with the identified client device, and control the communication interface to transmit, to the client device, a control command for controlling the displaying of the 360-degree video content to be displayed on the connected client device.

According to an embodiment, the processor may be further configured to execute the one or more instructions to identify the client device by receiving, from the client device, a signal including information indicating that the client device has the 360-degree video content-displaying capability.

According to an embodiment, the processor may be further configured to execute the one or more instructions to detect an orientation of the companion screen device, and transmit device orientation information about the orientation of the companion screen device to the client device via the communication channel such that a point of view of the 360-degree video content displayed on the client device is rotated according to the orientation of the companion screen device.

A method of operating a client device, according to an embodiment, includes: displaying at least a part of 360-degree video content; identifying a companion screen device having a 360-degree control capability to perform 360-degree control on the 360-degree video content; connecting a communication channel with the identified companion screen device; and controlling the displaying of the 360-degree video content according to a control command received from the connected companion screen device.

A method of operating a companion screen device, according to an embodiment, includes: identifying a client device having a 360-degree video content-displaying capability; connecting a communication channel with the identified client device; and transmitting, to the client device, a control command for controlling the displaying of the 360-degree video content to be displayed on the connected client device.

A computer program product according to an embodiment includes a computer-readable recording medium having recorded thereon one or more programs for performing a method of operating a client device, according to an embodiment, the method including: displaying at least a part of 360-degree video content; identifying a companion screen device having a 360-degree control capability to perform 360-degree control on the 360-degree video content; connecting a communication channel with the identified companion screen device; and controlling the displaying of the 360-degree video content according to a control command received from the connected companion screen device.

Mode of Disclosure

The terms as used herein will be briefly described and the present disclosure will be described in detail.

The terms as used herein are those general terms currently widely used in the art by taking into account functions in the present disclosure, but the terms may vary according to the intention of those of ordinary skill in the art, precedents, or new technology in the art. Moreover, specified terms may be selected by the applicant, and in this case, the detailed meaning thereof will be described in the detailed description of the present disclosure. Therefore, the terms as used herein should be understood not as simple names but based on the meaning of the terms and the overall description of the present disclosure.

It will be understood that the terms such as "comprise", "include", and "have", when used herein, specify the presence of stated elements, but do not preclude the presence or addition of one or more other elements. The terms "interface" and "module" as used herein represent a unit for processing at least one function or operation, which may be implemented by hardware, software, or a combination thereof.

Hereinafter, embodiments of the present disclosure will be described in detail with reference to the accompanying drawings so that those of ordinary skill in the art may easily carry out the present disclosure. However, the present disclosure may be embodied in many different forms and is not limited to the embodiments of the present disclosure described herein. In order to clearly describe the present disclosure, parts having no relation to the description are omitted, and like reference numerals are assigned to like elements throughout the specification.

In embodiments of the present specification, the term "user" refers to a person who controls a function or an operation of an image display apparatus by using a control device and may include a viewer, an administrator, or an installation engineer.

FIG. 1 is a diagram illustrating a client device 100 that displays a 360-degree image and a control device, according to an embodiment.

Referring to FIG. 1, the client device 100 according to the embodiment may display a 360-degree image. The 360-degree image according to the embodiment may be an image having an angle of view of 360 degrees. The 360-degree image may be a still image, a moving image, or a panoramic image. For example, the 360-degree image may be an image generated based on a plurality of images captured in a 360-degree direction by using at least one camera. In this case, the captured images may be mapped to a sphere, and the contact points of the mapped images may be stitched to generate a spherical 360-degree image. Also, the spherical 360-degree image may be converted into a planar 360-degree image 10 as illustrated in FIG. 1 in order for storage or transmission to another device.

The client device 100 according to the embodiment may perform graphics processing on the planar 360-degree image 10 so as to convert the planar 360-degree image 10 into a spherical 360-degree image 20. The client device 100 may select a partial area 30 of the spherical 360-degree image corresponding to a certain point of view, for example, a certain angle of view, and display an image corresponding to the selected area 30 on a display. In this case, the client device 100 may scale and display the image corresponding to the selected area 30 according to a resolution of the display. A detailed description of the angle of view of the 360-degree image will be described below with reference to FIG. 2.

The client device 100 according to the embodiment may be a TV, but this is merely an embodiment. The client device 100 may be implemented as an electronic device including a display. For example, the client device 100 may be implemented as various electronic devices, such as mobile phones, tablet PCs, digital cameras, camcorders, notebook computers (laptop computers), desktop computers, e-book terminals, digital broadcasting terminals, personal digital assistants (PDAs), portable multimedia players (PMPs), navigations, MP3 players, and wearable devices. In particular, embodiments may be easily implemented in display apparatuses having a large display such as a TV, but the present disclosure is not limited thereto. Also, the client device 100 may be stationary or mobile and may be a digital broadcasting receiver capable of receiving digital broadcasting.

The client device 100 may be controlled by a control device 50, and the control device 50 may be implemented as a remote controller or various types of devices for controlling the client device 100 such as a mobile phone.

Also, the control device 50 may control the client device 100 by using short-range communication including infrared communication or Bluetooth communication. The control device 50 may control the function of the client device 100 by using at least one of a provided key (including a button), a touchpad, a microphone (not illustrated) capable of receiving a voice of a user, and a sensor (not illustrated) capable of recognizing a motion of the control device 50.

The control device 50 according to the embodiment may include a four-way key (or a four-way button). The four-way key may be used to move the position of the partial area 30 displayed on the display within the 360-degree image.

Also, the control device 50 may be a pointing device. For example, the control device 50 may operate as a pointing device when a particular key input is received. When the control device 50 operates as a pointing device, the client device 100 may be controlled by a user input of moving the control device 50 vertically or horizontally or tilting the control device 50 in an arbitrary direction. Information about the movement of the control device 50 detected through the sensor of the control device 50 may be transmitted to the client device 100. The client device 100 may move the partial area 30 displayed on the display within the 360-degree image based on the information about the movement of the control device 50.

Alternatively, when the control device 50 includes a touchpad, the position of the partial area 30 displayed on the display may be moved within the 360-degree image according to a displacement value of a subject such as a user's finger moving on the touchpad.

Figure 2:
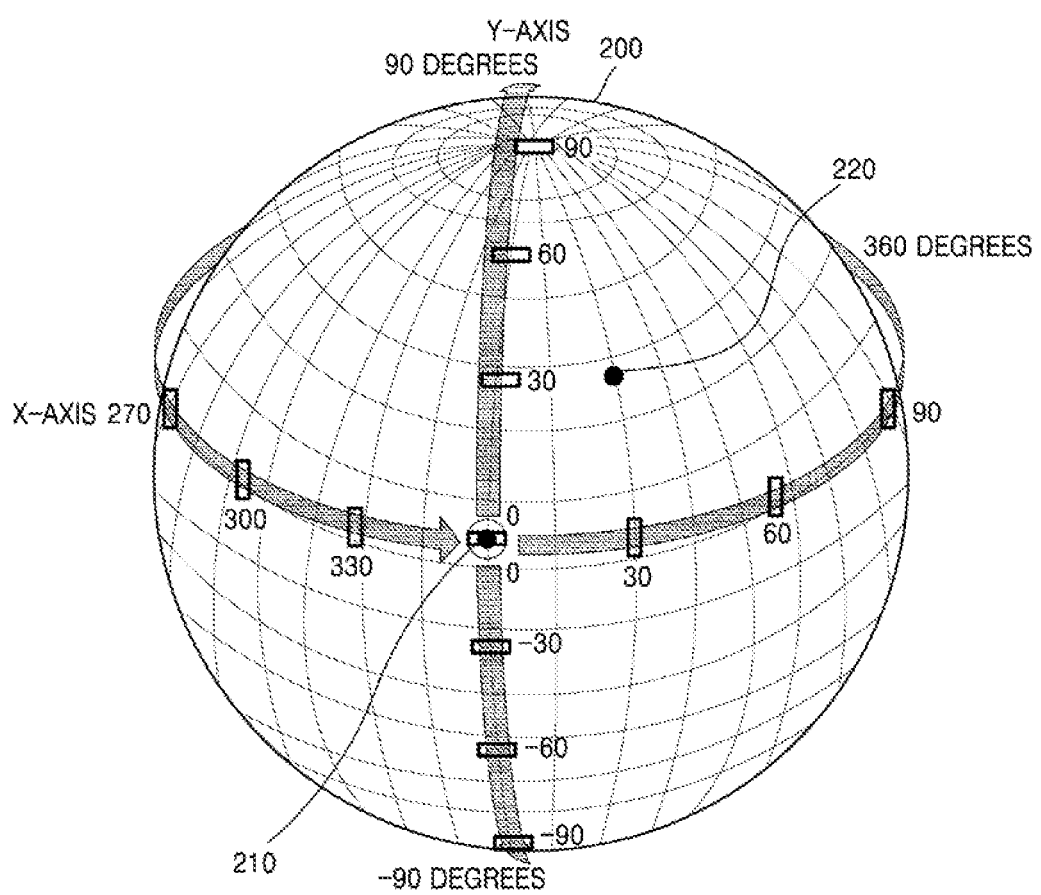
FIG. 2 is a diagram for describing an angle of view of a 360-degree image.

FIG. 2 is a diagram for describing an angle of view of a 360-degree image.

As described above, the 360-degree image may be an image generated based on a plurality of images captured in a 360-degree direction by using at least one camera. In this case, the captured images may be mapped to a sphere, and the contact points of the mapped images may be stitched to generate a spherical 360-degree image.

The 360-degree image may refer to an image having an angle of view of 360 degrees. When the 360-degree image is expressed as the spherical image 200, the angle of view of the 360-degree image may be composed of x-axis coordinate and y-axis coordinate. The x-axis coordinate may represent an angle formed while a longitudinal plane passing through the center of the sphere rotates along the surface of the sphere. The y-axis coordinate may represent an angle formed while a transverse plane passing through the center of the sphere rotates along the surface of the sphere. For example, the x-axis coordinate may be in a range of 0 degrees to 360 degrees. For example, the y-axis coordinate may be in a range of −90 degrees to 90 degrees or 0 degrees to 180 degrees.

For example, referring to FIG. 2, when an angle (x, y) of view at a certain point 210 located on the surface of the sphere in the spherical image 200 is set to (0 degrees, 0 degrees), an angle of view of a point 220 may be (30 degrees, 30 degrees).

Figure 3:
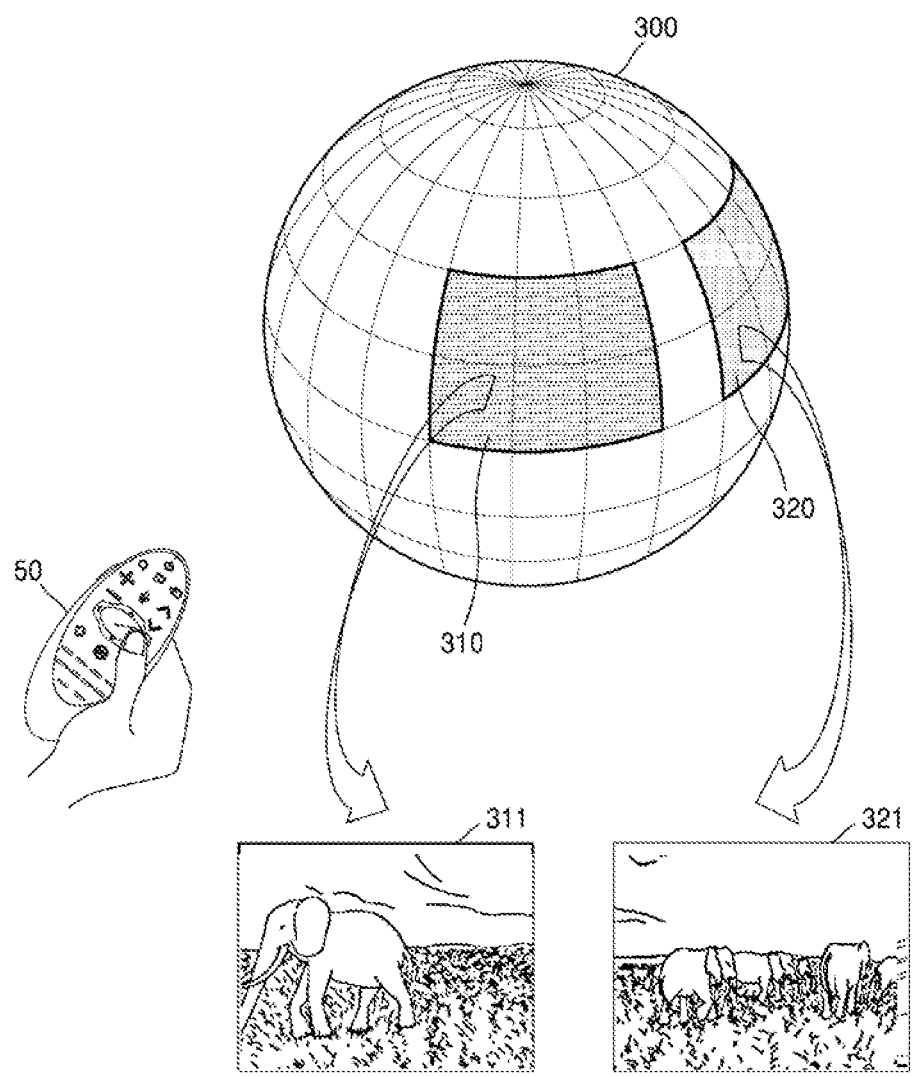
FIG. 3 is a diagram illustrating a method of displaying a 360-degree image, according to an example.

FIG. 3 is a diagram illustrating a method of displaying a 360-degree image, according to an example.

A user may navigate a 360-degree image 300 so as to watch an image corresponding to a desired angle among 360-degree images. Referring to FIG. 3, for example, when the user watches an image 311 corresponding to an area 310 corresponding to a particular angle of view and wants to watch an image of an area located in a right direction, the user may select a user input of adjusting the angle of view by using the control device 50. For example, when the user selects a user input of changing an angle of view to 40 degrees, the client device 100 may display an area 321 corresponding to an area 320 corresponding to an angle of view of 40 degrees.

According to an embodiment, the user may move the angle of view of the 360-degree image by using a four-way key of the control device 50. For example, the 360-degree image may be moved in a horizontal direction by using left and right arrow keys of the four-way key. For example, the 360-degree image may be moved in a vertical direction by using up and down arrow keys of the four-way key.

According to an embodiment, the user may adjust the angle of view of the 360-degree image by moving the control device 50 including an acceleration sensor or a gyroscope in a vertical direction, a horizontal direction, or an arbitrary direction.

According to an embodiment, the user may adjust the angle of view of the 360-degree image according to a moving direction while touching the touchpad provided in the control device 50 with the user's finger.

According to an embodiment, when the client device 100 is configured as a touch sensitive screen, the user may adjust the angle of view of the 360-degree image by using a touch movement of the user's finger on the touch sensitive screen of the client device 100.

According to an embodiment, the user may zoom in or zoom out the 360-degree image through a particular key or button of the control device 50 or a gesture using the control device 50. The client device 100 may enlarge and display a currently displayed area in response to a zoom-in input. The client device 100 may reduce and display a currently displayed area in response to a zoom-out input. According to an example, when the zoom-out degree exceeds a preset threshold value, the client device 100 may display an image in a spherical shape. For example, the zoom may be in a range of −4 times to 4 times.

Figure 4:
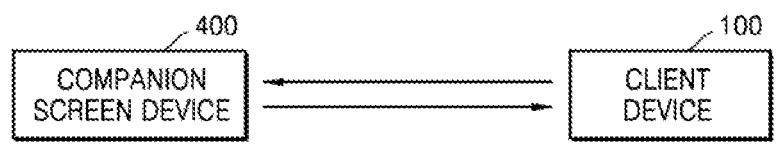
FIG. 4 illustrates a client device and a companion screen device, according to an embodiment.

FIG. 4 illustrates a client device and a companion screen device, according to an embodiment.

Referring to FIG. 4, the client device 100 such as a television displays a part of 360-degree video content. The client device 100 may control the 360-degree video content so as to change the point of view of the 360-degree video content to be displayed.

According to an embodiment, a communication channel may be established between the client device 100 that displays the 360-degree video content and the companion screen device 400 that controls the 360-degree video content.

The client device 100 may be, for example, a television. However, the client device 100 may be any appropriate display device. The client device 100 supports video and audio reproduction through a broadcast or broadband connection. The client device 100 may include an application that supports the displaying and control of the 360-degree video content. The application may notify a media player that the content is in a 360-degree format, so that the media player decodes the contents correctly. Examples of the application include an HbbTV application, and any appropriate application capable of supporting 360-degree content may be used.

The client device 100 may provide a field-of-view window for the user to watch 360-degree content at a particular point of view. Therefore, the user may watch a given angle range of the 360-degree content. The 360-degree content displayed on the client device 100 may be controlled so as to change the point of view at which the user watches the 360-degree content through the field-of-view window of the client device 100. The control may include rotating the point of view in the horizontal or vertical direction through the 360-degree video content. The control of the point of view of the 360-degree video content is the same as described above with reference to FIGS. 2 and 3. The control may also include changing a sensed zoom level of content so that the user appears to be farther or closer to an object displayed in 360-degree content.

The 360-degree video content may be rendered by a server and streamed to the client device 100. For example, the client device 100 may provide position information about 360-degree content to the server, and the server may render 360-degree content having a point of view corresponding to the position information provided by the client device 100. For example, high resolution may be achieved by utilizing server-side rendering.

Alternatively, the 360-degree video content may be rendered by the client device 100. Examples of an application capable of performing 360-degree video rendering in the client device 100 include WebGL and HbbTV, but the present disclosure is not limited. In the present disclosure, an application capable of supporting either or both of server-side rendering and client-side rendering may be used.

The companion screen device 400 may be, for example, a mobile phone or a tablet. The companion screen device 400 is a device having a screen capable of providing interaction between the client device 100 and the companion screen device 400. In the present disclosure, the companion screen device 400 may control 360-degree video content. The companion screen device 400 may include an application that supports the control of the 360-degree video content.

The communication channel between the client device 100 and the companion screen device 400 may be established in any appropriate manner. In some embodiments, the communication channel may be established via an IP network. For example, each of the client device 100 and the companion screen device 400 may be connected to a wireless network, through which signals may be transmitted between the client device 100 and the companion screen device 400.

Alternatively, Bluetooth may be used to establish a communication channel through which signals may be transmitted between the client device 100 and the companion screen device 400. However, any appropriate way for establishing a communication channel may be used. The way for establishing the communication channel may be wireless, but the communication channel may alternatively be established through a wired connection.

In an embodiment, the communication channel may be established for a companion screen device identified by the client device 100. For example, the companion screen device 400 may provide, to the client device 100, an indication that the companion screen device 400 is capable of 360-degree control.

Figure 5:
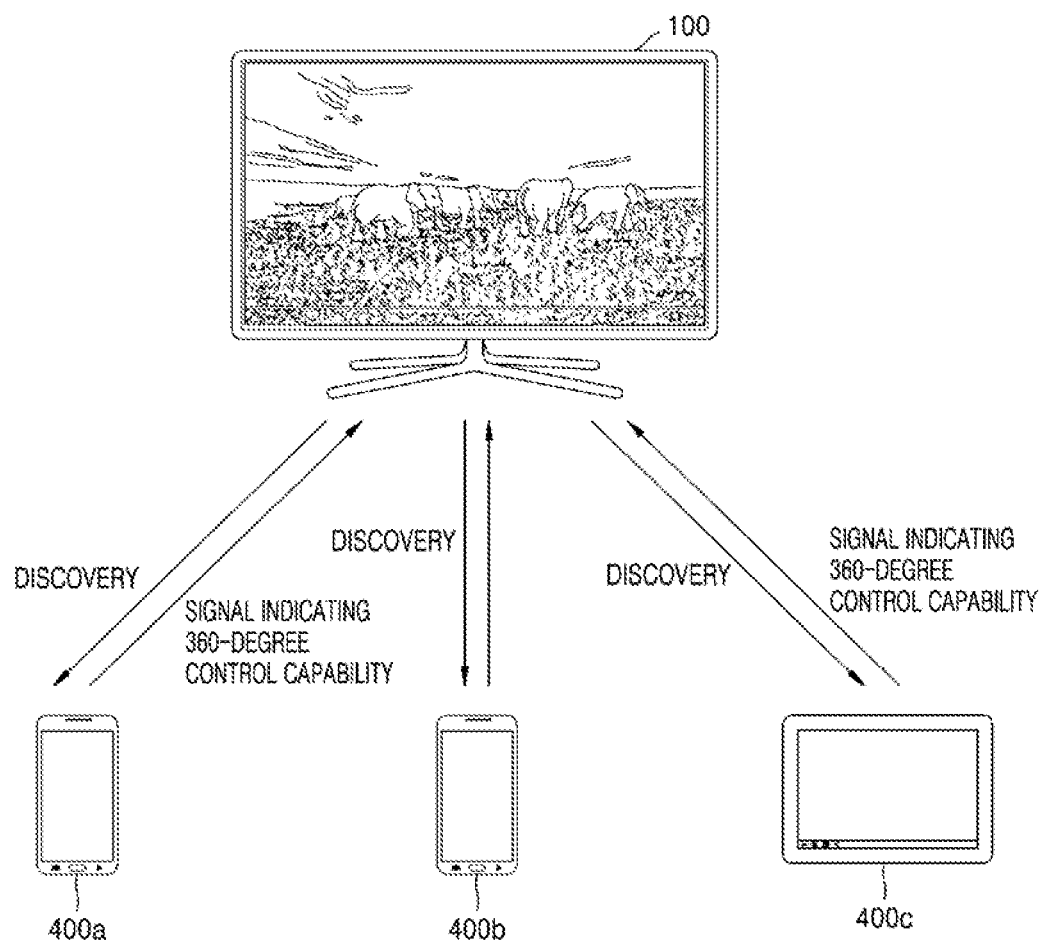
FIG. 5 illustrates a client device and a plurality of companion screen devices, according to an embodiment.

FIG. 5 illustrates a client device and a plurality of companion screen devices, according to an embodiment.

According to an embodiment, the client device 100 may identify a plurality of companion screen devices 400 capable of 360-degree control. In this case, the client device 100 may select at least one of the companion screen devices 400 and connect to the selected companion screen device 400. The client device 100 may connect to one or more companion screen devices 400.

Referring to FIG. 5, when the client device 100 transmits a discovery request signal to peripheral devices, companion screen devices 400a, 400b, and 400c located around the client device 100 may transmit, to the client device 100, a signal indicating that the companion screen devices 400a, 400b, and 400c each have 360-degree control capability. As such, when the signal indicating the 360-degree control capability is received from a plurality of companion screen devices, the client device 100 may select a companion screen device by various methods according to a policy of the client device 100.

According to an embodiment, the client device 100 may automatically select the companion screen device 400 according to one or more certain selection criteria.

According to an embodiment, the client device 100 may select the companion screen device 400 based on a user profile associated with the companion screen device 400.

According to an embodiment, the client device 100 may select one or more companion screen devices 400 according to a proximity to the client device 100.

Figure 6:
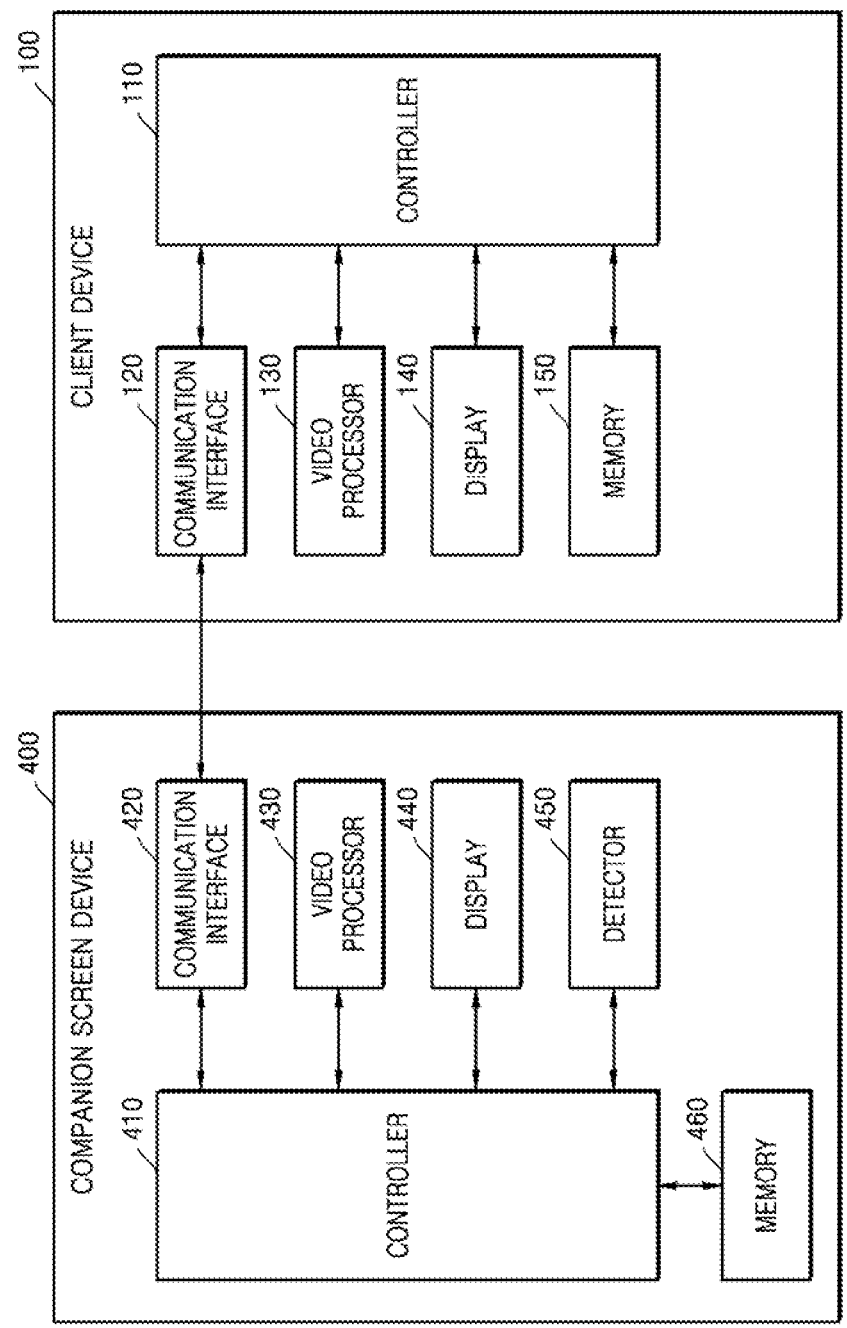
FIG. 6 is a schematic block diagram of a client device 100 and a companion screen device 400, according to an embodiment.

FIG. 6 is a schematic block diagram of the client device 100 and the companion screen device 400, according to an embodiment.

Referring to FIG. 6, the companion screen device 400 includes a controller 410, a communication interface 420, a video processor 430, a display 440, a detector 450, and a memory 460.

The communication interface 420 enables the companion screen device 400 to communicate with the client device 100 by using various communication technologies, such as screen mirroring, DLNA, Bluetooth, Miracast, and Wi-Fi Direct.

The video processor 430 may perform signal processing on an image to be displayed by the display 440 and may perform a variety of image processing, such as decoding, scaling, noise filtering, frame rate conversion, and resolution conversion, on video data.

The display 440 generates a driving signal by converting an image signal, a data signal, an OSD signal, a control signal, and the like, which are processed by the video processor 430. The display 440 may be implemented as a PDP, an LCD, an OLED, a flexible display, or the like, and may also be implemented as a 3D display. Also, the display 440 may be configured as a touch screen and used as an input device as well as an output device.

The detector 450 may detect a user input and transmit the detected signal to the controller 410.

The detector 450 may include a microphone that receives a voice of the user, a camera that receives an image of the user, or an optical receiver or a touchpad that detects an interaction of the user.

The detector 450 according to the embodiment may detect an input of moving the position of the partial area of the 360-degree image displayed on the display 640, that is, a user input of controlling the point of view of the 360-degree image, an input of zooming in or zooming out the image displayed on the display, an Input of displaying an image corresponding to the area of the particular position in the 360-degree image, and the like.

The detector 450 according to the embodiment may include an orientation sensor that measures an orientation of the companion screen device 400.

The memory 460 may include an operating system, data processed by the controller 410, and one or more instructions executed by the controller 410.

In particular, the memory 460 according to the embodiment may include one or more instructions for identifying the client device having the 360-degree video content-displaying capability, controlling the communication interface to connect the identified client device to the communication channel, and controlling the communication interface to transmit, to the client device, the control command for controlling the displaying of the 360-degree video content to be displayed on the connected client device.

In an embodiment, the term "memory" includes a storage, ROM or RAM of the controller, or a memory card (not illustrated) (for example, a micro SD card or a USB memory) provided in the companion screen device 400. Also, the memory 460 may include non-volatile memory, volatile memory, a hard disk drive (HDD), or a solid state drive (SSD).

The controller 410 may control the overall operation of the companion screen device 400 and the signal flow between the internal elements of the companion screen device 400 and may execute the data processing function. When a user input is received or a prestored condition is satisfied, the controller 410 may execute an operating system (OS) and various applications stored in the memory 460.

The controller 410 may include RAM that stores a signal or data input from the outside of the companion screen device 400 or is used as storage areas corresponding to various operations performed by the companion screen device 400, ROM that stores a control program for controlling the companion screen device 400, and a processor.

According to an embodiment, the controller 410 may execute one or more instructions stored in the memory to perform a communication operation between the companion screen device 400 and the client device disclosed in the present specification.

According to an embodiment, the controller 410 may execute the one or more instructions to identify the client device having the 360-degree video content-displaying capability, control the communication interface to connect the identified client device to the communication channel, and control the communication interface to transmit, to the client device, the control command for controlling the displaying of the 360-degree video content to be displayed on the connected client device.

According to an embodiment, the controller 410 may execute the one or more instructions to identify the client device by receiving, from the client device, a signal including information indicating that the client device has the 360-degree video content-displaying capability.

According to an embodiment, the controller 410 may execute the one or more instructions to detect the orientation of the companion screen device and transmit device orientation information about the orientation of the companion screen device to the client device via the communication channel such that the point of view of the 360-degree video content displayed on the client device is rotated according to the orientation of the companion screen device.

The companion screen device 400 may further include, in addition to the configuration illustrated in FIG. 6, an audio processor that processes audio data, an audio outputter that outputs audio, and an inputter/outputter that receives video, audio, and additional information from the outside of the companion screen device 400.

Also, the companion screen device 400 is not limited to the term, and any electronic devices such as a laptop, a smart phone, a tablet, a wearable device, or a PDA may be used as long as the electronic devices include a processor and a memory and execute applications.

The client device 100 includes a controller 110, a communication interface 120, a video processor 130, a display 140, and a memory 150.

The communication interface 120 enables the client device 100 to communicate with the companion screen device 400 by using various communication technologies, such as screen mirroring, DLNA, Bluetooth, Miracast, and Wi-Fi Direct.

The video processor 130 may perform signal processing on an image to be displayed by the display 140 and may perform a variety of image processing, such as decoding, scaling, noise filtering, frame rate conversion, and resolution conversion, on video data.

The display 140 generates a driving signal by converting an image signal, a data signal, an OSD signal, a control signal, and the like, which are processed by the video processor 130. The display 140 may be implemented as a PDP, an LCD, an OLED, a flexible display, or the like, and may also be implemented as a 3D display. Also, the display 140 may be configured as a touch screen and used as an input device as well as an output device.

The memory 150 may include an operating system, data processed by the controller 110, and one or more instructions executed by the controller 110.

In particular, the memory 150 according to the embodiment may include one or more instructions for identifying the companion screen device having a 360-degree control capability to perform 360-degree control on the 360-degree video content, controlling the communication interface so as to connect a communication channel with the identified companion screen device, and controlling the display to control the displaying of the 360-degree video content according to a control command received from the connected companion screen device.

The memory 150 may include an operating system, data processed by the controller 110, and one or more instructions executed by the controller 110.

In an embodiment, the term "memory" includes a storage, ROM or RAM of the controller, or a memory card (not illustrated) (for example, a micro SD card or a USB memory) provided in the companion screen device 400. Also, the memory 150 may include non-volatile memory, volatile memory, a hard disk drive (HDD), or a solid state drive (SSD).

The controller 110 may control the overall operation of the client device 100 and the signal flow between the internal elements of the client device 100 and may execute the data processing function. When a user input is received or a prestored condition is satisfied, the controller 110 may execute an operating system (OS) and various applications stored in the memory 150.

The controller 110 may include RAM that stores a signal or data input from the outside of the client device 100 or is used as storage areas corresponding to various operations performed by the client device 100, ROM that stores a control program for controlling the client device 100, and a processor.

According to an embodiment, the controller 110 may execute one or more instructions stored in the memory to control the display to display at least a part of the 360-degree video content, identify the companion screen device having a 360-degree control capability to perform 360-degree control on the 360-degree video content, control the communication interface to connect the identified companion screen device to the communication channel, and control the display to control the displaying of the 360-degree video content according to a control command received from the connected companion screen device.

According to an embodiment, the controller 110 may execute the one or more instructions to request the identified companion screen device to execute an application that performs a control operation of displaying the 360-degree video content.

According to an embodiment, the controller 110 may execute the one or more instructions to identify the companion screen device by transmitting a request signal for discovering the companion screen device and receiving, from the companion screen device, a signal including information indicating that the companion screen device has the 360-degree control capability.

According to an embodiment, the controller 110 may execute the one or more instructions to receive, from a plurality of companion screen devices, a signal including information indicating that the companion screen devices have the 360-degree control capability, select at least one of the companion screen devices, and control the communication interface to connect with the selected at least one companion screen device.

According to an embodiment, the controller 110 may execute the one or more instructions to select at least one of the companion screen devices based on a user profile associated with the companion screen device.

According to an embodiment, the controller 110 may execute the one or more instructions to select at least one of the companion screen devices based on a proximity between the client device and the companion screen device.

According to an embodiment, the controller 110 may execute the one or more instructions to select at least one of the companion screen devices based on a learning algorithm.

According to an embodiment, the controller 110 may execute the one or more instructions to receive device orientation information about the orientation of the companion screen device via the communication channel, adjust the point of view of the displayed 360-degree video content in response to the device orientation information such that the point of view of the displayed 360-degree video content is rotated according to the orientation of the companion screen device, and control the display to display an area of the 360-degree video content corresponding to the adjusted point of view.

According to an embodiment, the device orientation information may include a plurality of orientation values measured by one or more sensors arranged to detect the orientation of the companion screen device, and the controller 410 may execute the one or more instructions to smooth the orientation values so as to acquire smoothed orientation data and determine a point-of-view rotation speed of the 360-degree video content based on the smoothed orientation data.

The client device 100 may further include, in addition to the configuration illustrated in FIG. 6, an audio processor that processes audio data, an audio outputter that outputs audio, an inputter/outputter that receives video, audio, and additional information from the outside of the client device 100, a tuner that receives a broadcast signal, and a detector that detects a voice of the user, an image of the user, and an interaction of the user.

Moreover, the block diagram of the client device 100 or the companion screen device 400 illustrated in FIG. 6 is a block diagram for an embodiment. Each element of the block diagram may be integrated, added, or omitted according to the specification of the client device 100 that is actually implemented. That is, when necessary, two or more elements may be integrated into one element, or one element may be divided into two or more elements. Furthermore, the function performed by each block is provided for describing the embodiments, and a specific operation or device thereof does not limit the scope of the present disclosure.

Figure 7:
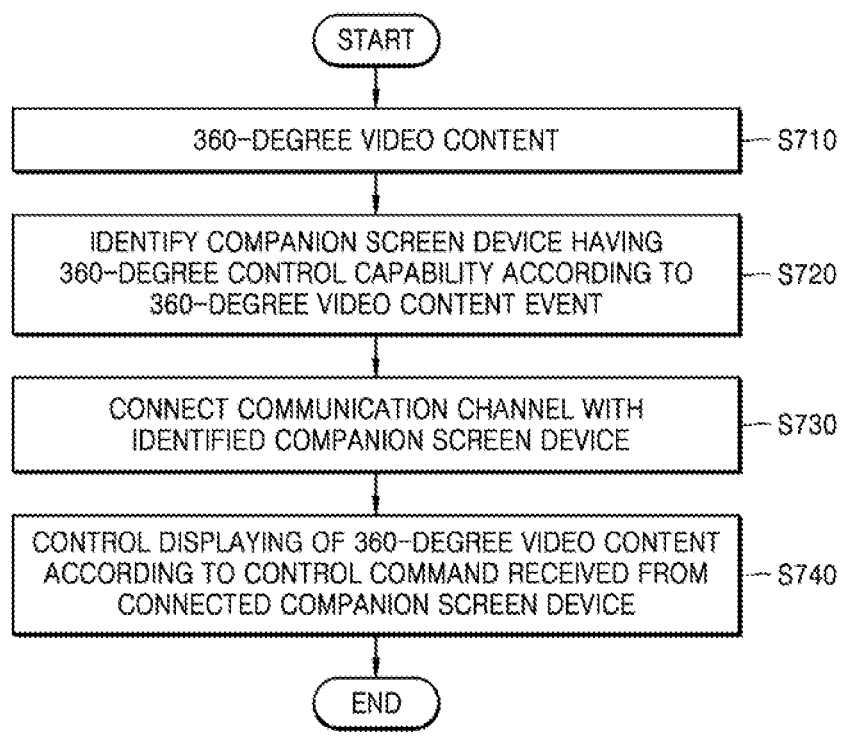
FIG. 7 is a flowchart of a method by which the client device 100 displays 360-degree video content, according to an embodiment.

FIG. 7 is a flowchart of a method by which the client device 100 displays 360-degree video content, according to an embodiment.

According to embodiments, all operations of the method may be performed by the same device, or different operations may be performed by different devices. Any operations illustrated in FIG. 7 may be performed by software or hardware according to a particular embodiment. When one or more operations are performed by software, a device for performing the method may include a processing unit including one or more processors, and a computer-readable memory that stores computer program commands for, when executed by the processing unit, performing the method.

Referring to FIG. 7, in operation S710, the client device 100 may acquire a 360-degree video content event.

The 360-degree video content event may be acquired by various methods. For example, the 360-degree video content event may be acquired when a user input of displaying the 360-degree video content is received from a user, when a timing of displaying the 360-degree video content is reached by setting information inside the client device 100, or when an external device containing the 360-degree video content is connected and the client device 100 receives the 360-degree video content.

When such a 360-degree video content display event occurs, the client device 100 may display the 360-degree video content on the display. Alternatively, the client device may display the 360-degree video content at any of the operations illustrated in FIG. 7.

In operation S720, the client device 100 may identify a companion screen device having a 360-degree control capability according to the 360-degree video content event.

According to an embodiment, the client device 100 may identify the companion screen device having the 360-degree control capability by transmitting a discovery request signal for discovering the companion screen device having the 360-degree control capability and receiving, from the companion screen device, an indication that the companion screen device has the 360-degree control capability in response to the discovery request signal.

Figure 8:
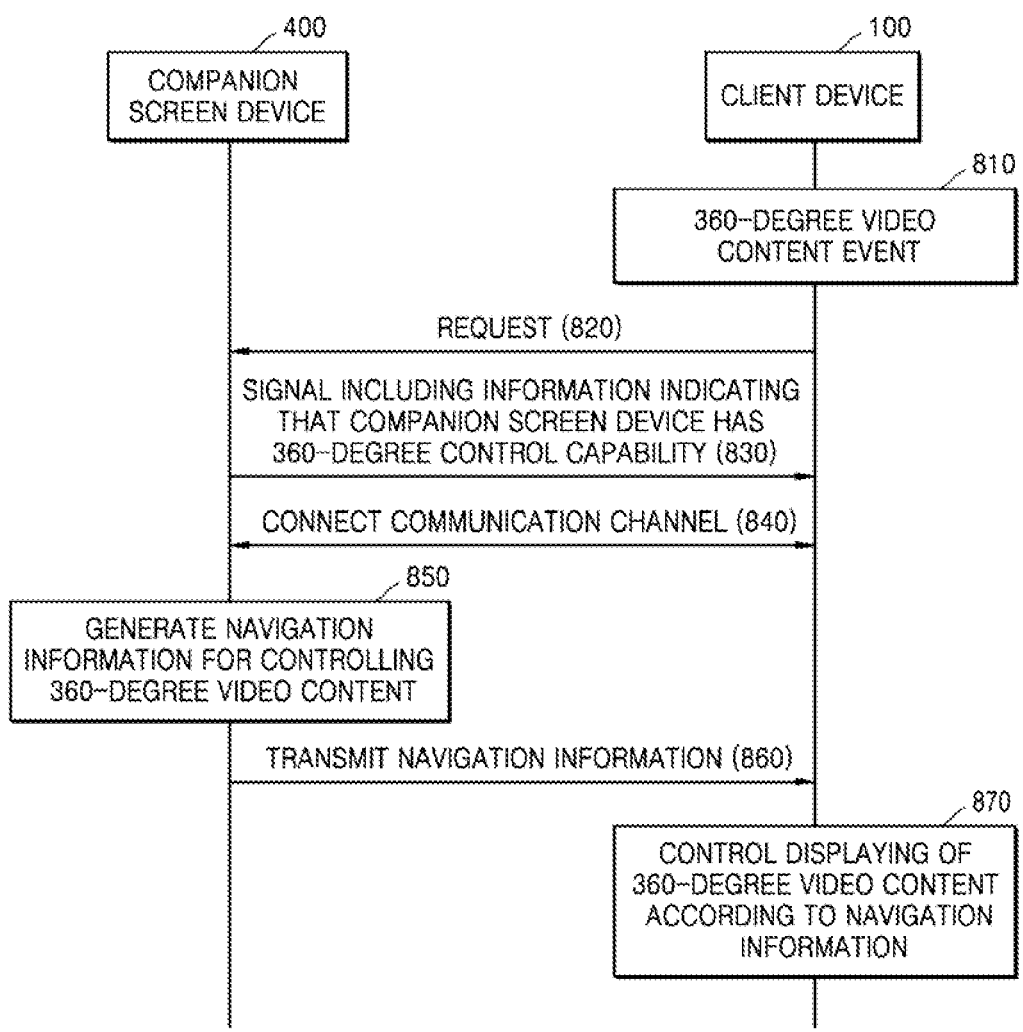
FIG. 8 illustrates an example of an operation by which the client device 100 identifies the companion screen device 400, according to an embodiment.

According to an embodiment, the client device 100 may identify a single companion screen device 400, as illustrated in FIG. 8.

Figure 9:
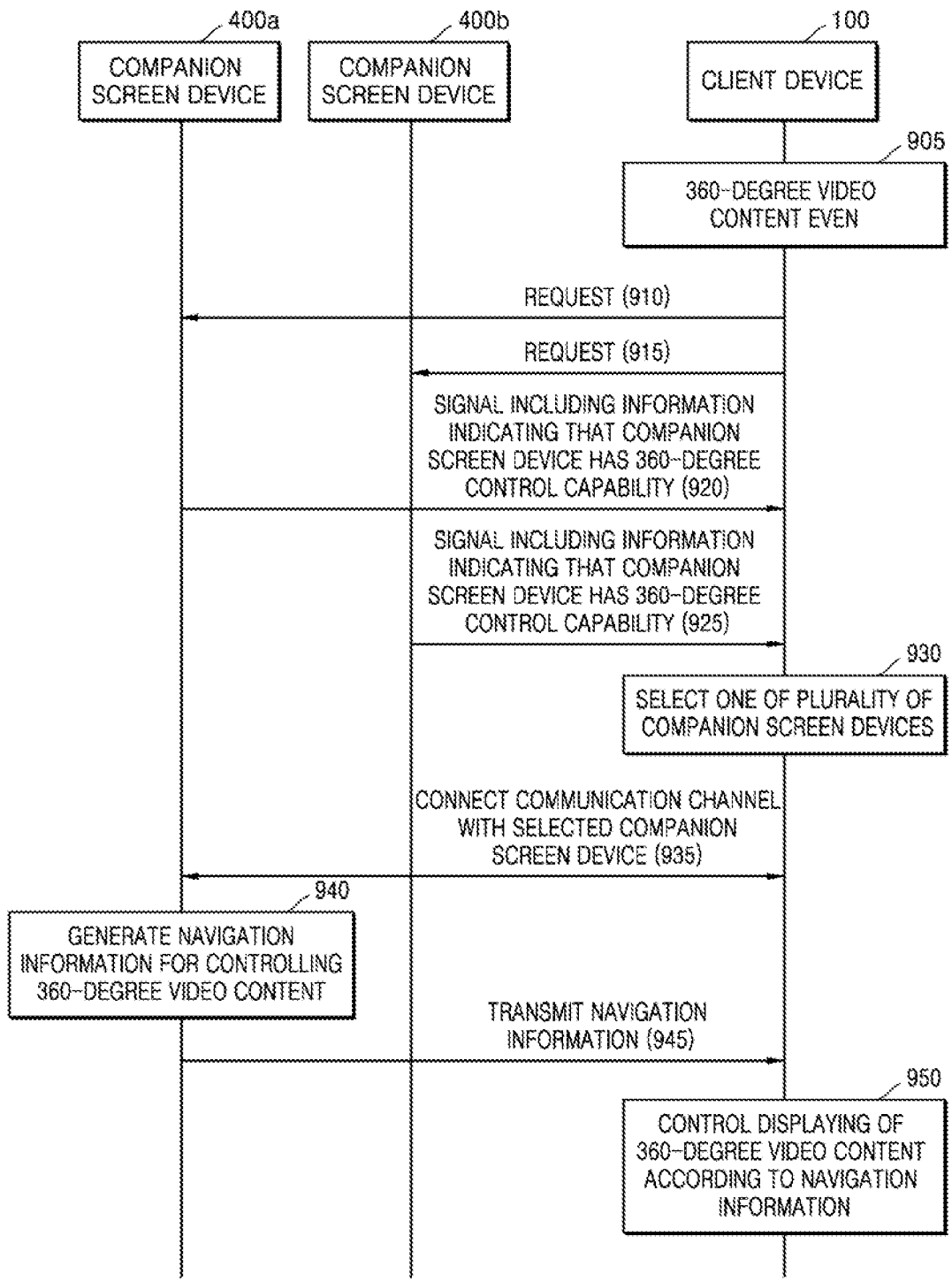
FIG. 9 illustrates an example of an operation by which the client device 100 identifies a plurality of companion screen devices 400 and selects one of the companion screen devices 400, according to an embodiment.

According to an embodiment, the client device 100 may identify a plurality of companion screen devices 400 and select one or more of the companion screen devices 400, as illustrated in FIG. 9.

In operation S730, the client device 100 may connect the communication channel to the identified companion screen device 400.

In operation S740, the client device 100 may control the displaying of the 360-degree video content according to a control command received from the connected companion screen device.

As illustrated in FIGS. 1 to 3, the 360-degree video may include a field of view of 360 degrees in both the horizontal and vertical directions. A part of the 360-degree video content may be displayed on the client device 100, as illustrated in FIG. 1. The content displayed on the client device 100 may be changed by rotating the point of view so that a part of the 360-degree video content displayed on the client device 100 may be changed. The displayed part of the 360-degree content may have a point of view from a zoom level given to the 360-degree video content. The 360-degree video content may be controlled to change the zoom level of the point of view. The 360-degree video content may be controlled by the companion screen device 400.

In some embodiments, a part of the 360-degree video content may be displayed on the client device 100 before the communication channel is established between the client device 100 and the companion screen device 400. For example, the 360-degree content may be selected and controlled by using a television remote control before the communication channel is established between the client device 100 and the companion screen device 400. For example, there may be no available companion screen device 400 capable of controlling the 360-degree content. When the companion screen device 400 capable of controlling the 360-degree content is available, a communication link may be established and operation S740 may be performed.

In operation S740, the method further includes controlling the point of view of the displayed 360-degree video content in response to signals received from the companion screen device 400 via the communication channel. The signals provided from the companion screen device to the client device 100 may include a command regarding the point of view of the 360-degree video content. The user may input the command to the companion screen device 400.

For example, a user interface may be displayed on the companion screen device 400. The user interface may be configured to allow the user to input a command regarding the point-of-view control of the 360-degree content. The companion screen device 400 may be configured to provide the command received through the user interface to the client device 100 via signals on the communication channel. The control commands that may be input through the user interface are described in detail with reference to FIGS. 15 to 17. The control command may be a navigation command for changing the view of the 360-degree video content. Therefore, the point of view of the 360-degree video content displayed on the client device 100 may be adjusted according to the navigation command.

In some embodiments, the user interface may be displayed on a screen of the companion screen device, and the user may input the command for controlling the 360-degree content through the interaction with the displayed user interface. For example, the companion screen device may be a touch screen phone or a tablet device, and the user may input a command by touching the screen of the companion screen device.

In some embodiments, the companion screen device 400 may display the 360-degree content on the full screen. A user command pointing to the area of the 360-degree content may be received through the companion screen device 400. The point of view of the 360-degree video content may be controlled such that the portion of the 360-degree video content displayed on the client device 100 includes the pointed area.

The command regarding the point of view may correspond to the orientation of the companion screen device, and the signals that the client device 100 receives via the communication channel may include orientation information about the orientation of the companion screen device 400. The point of view of the 360-degree video content may be adjusted in response to the received device orientation information, such that the point of view of the 360-degree video content is rotatable based on the orientation of the companion screen device 400.

One or more sensors arranged in the companion screen device 400 so as to detect the orientation of the companion screen device 400 may measure a plurality of orientation values.

The client device 100 may smooth the orientation values so as to acquire smoothed orientation data, and the client device 100 may determine the rotation speed of the point of view of the 360-degree video content based on the smoothed orientation data.

FIG. 8 illustrates an example of an operation by which the client device 100 identifies the companion screen device 400, according to an embodiment.

Referring to FIG. 8, in operation 810, a 360-degree video content event may occur in the client device 100. The 360-degree video content event may include any operation of triggering reproduction of 360-degree video content.

In operation 820, the client device 100 may transmit a discovery request signal so as to search for a companion screen device capable of controlling the 360-degree video content.

In operation 830, the companion screen device 400 may transmit, to the client device 100, a signal including information indicating that the companion screen device 400 has a 360-degree control capability.

In operation 840, the client device 100 may identify the companion screen device 400 by receiving, from the companion screen device 400, the signal including the information indicating that the companion screen device 400 has the 360-degree control capability. Therefore, a communication channel may be connected between the client device 100 and the companion screen device 400.

In operation 850, the companion screen device 400 may generate navigation information for controlling the 360-degree video content. In operation 860, the companion screen device 400 may transmit the generated navigation information to the client device 100.

In operation 870, the client device 100 may control the displaying of the 360-degree video content according to the navigation information received from the companion screen device 400.

FIG. 9 illustrates an example of an operation by which the client device 100 identifies a plurality of companion screen devices 400 and selects one of the companion screen devices 400, according to an embodiment.

Referring to FIG. 9, in operation 905, a 360-degree video content event may occur in the client device 100. The 360-degree video content event may include any operation of triggering reproduction of 360-degree video content.

In operations 910 and 915, the client device 100 may transmit a discovery request signal so as to search for companion screen devices located around the client device 100 and capable of controlling the 360-degree video content.

In operations 920 and 925, companion screen devices 400a and 400b may transmit, to the client device 100, a signal including information indicating that the companion screen devices 400a and 400b have a 360-degree control capability.

In operation 930, the client device 100 may select one of a plurality of companion screen devices.

For example, the client device 100 may select one of the companion screen devices, or may select two or more of the companion screen devices.

For example, in operation 935, when the client device 100 selects the companion screen device 400a, the client device 100 may connect a communication channel with the companion screen device 400a.

In operation 940, the companion screen device 400a may generate navigation information for controlling the 360-degree video content. In operation 945, the companion screen device 400a may transmit the generated navigation information to the client device 100.

In operation 950, the client device 100 may control the displaying of the 360-degree video content according to the navigation information received from the companion screen device 400a.

Figure 10:
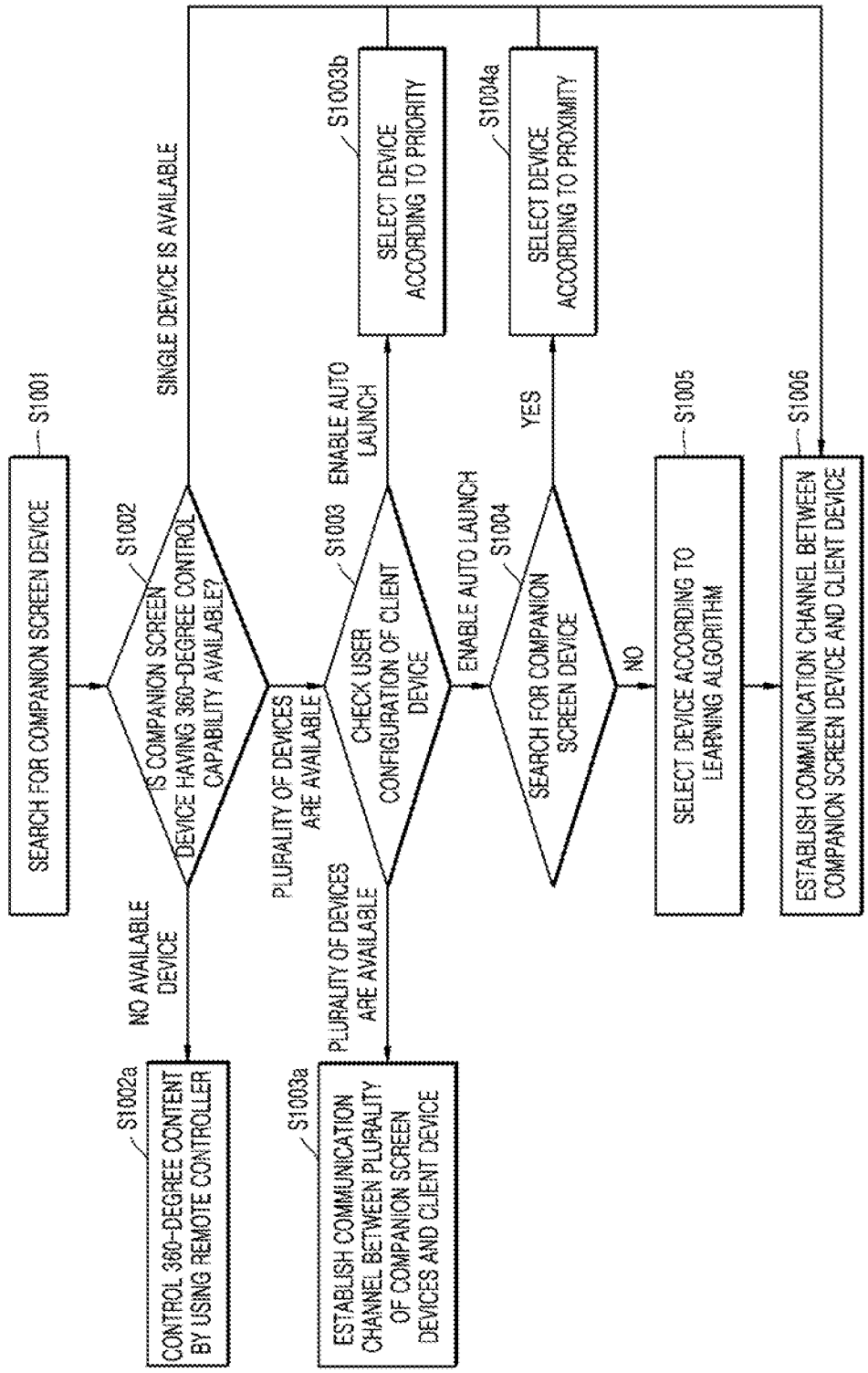
FIG. 10 is a flowchart describing in detail an operation of establishing a communication channel between the client device 100 and the companion screen device 400, according to an embodiment.

FIG. 10 is a flowchart describing in detail an operation of establishing the communication channel between the client device 100 and the companion screen device 400, according to an embodiment. According to embodiments, all operations of the method may be performed by the same device, or some operations may be performed by different devices. Any operations illustrated in FIG. 10 may be performed by software or hardware according to a particular embodiment. When one or more operations are performed by software, a device for performing the method may include a processing unit including one or more processors, and a computer-readable memory that stores computer program commands for, when executed by the processing unit, performing the respective operations of the method.

In operation S1001, the client device 100 may search for the companion screen device 400 capable of controlling 360-degree content. For example, the client device 100 may perform a search request for searching for the companion screen device 400 capable of controlling the 360-degree content. After the appropriate companion screen device 400 is discovered, the client device 100 may transmit a launch request. For example, the launch request may be transmitted from the client device 100 by a client application. The search and launch requests may be transmitted through an IP network, or may be transmitted through any appropriate way for establishing, for example, a communication channel. A protocol for discovering the companion screen device 400 may be any suitable protocol and may conform with, for example, a protocol configured by a manufacturer of the client device 100.

A client application suitable for transmitting the search and/or launch request may be, for example, an HbbTV application. This standard defines an application programming interface (API) that an application may use to discover the companion screen device 400. However, the application used to discover the companion screen device 400 may be any suitable application. For example, a manufacturer of the client device 100 and/or the companion screen device 400 may define a protocol that provides a function necessary for performing the search for the companion screen device 400.

In operation S1002, the client device 100 may determine whether the arbitrary companion screen device 400 having a 360-degree content control capability is available.

The companion screen device 400 may include a launcher application. The launcher application is configured to receive a launch request from the client device 100. The launcher application may be the same as defined in HbbTV 2.0.1. In an embodiment of the present disclosure, the launcher application of the client device 100 may be configured to execute a control application according to the request from the client device 100 in response to the reception of the launch request from the client device 100. Alternatively, the launcher application may execute an application store app or website in response to the request from the client, and the user may download, via the application store app or the website, a control program capable of controlling the 360-degree video content displayed on the client device 100.

The launcher application may be a known launcher application that may be modified so as to provide the function of supporting the control of the 360-degree content.

The launcher application may be executed in the background on the companion screen device 400 so as to receive the request from the client device 100. In response to the reception of the request from the client device 100, the launcher application may notify the client device 100 that the companion screen device has the 360-degree control capability. However, the companion screen device can indicate in any appropriate way that the companion screen device has the 360-degree control function, and this is not limited to the use of the launcher application.

The indication that the companion screen device 400 has the 360-degree control capability may be transmitted from the companion screen device 400 to the client device 100 via the communication channel (for example, the IP network) through which the launch request from the client device 100 is transmitted.

In response to the reception of, from the companion screen device 400, the indication that the companion screen device 400 has the 360-degree control capability, the client device 100 may determine whether the appropriate control application is available. The client device 100 and the companion screen device 400 establish the communication channel therebetween, and control signal information is transmitted from the companion screen device 400 to the client device 100. For example, the client application that is being executed on the client device 100 may establish app to app communication with the control application that is executed on the companion screen device 400. This app to app communication may be established through, for example, a web socket.

The companion screen device 400 may signal availability by using zero configuration networking. Thereafter, the client device 100 may discover devices on the network and query capabilities of the devices. The capabilities of the devices may be found through a companion screen ID string. In HbbTV, the string may be defined as a CS_OS_ID string. The string may be extended to signal to the client application that the application on the companion screen device 400 has the 360-degree control capability. The string may be extended to be backward compatible with a previous version so as not to affect the client devices 100 that do not have the 360-degree content displaying function.

An example of the HbbTV CS OS ID string is as follows:
csoid=launcher WS user_agent_string
launcher=launcher_product [launcher_comment]
launcher_product=launcher_name "/" launcher_version
launcher_comment=WS "(" comment_body ")"
comment_body=comment 0*(";" WS comment)
comment=store_info|manufacturer_specific_comment
store_info="appstore" "/" app_store_is
WS=1*" "

Therefore, the signal of the 360-degree control function may be added to a launcher comment as follows:
launcher_comment="("360_control_supported")"

When it is determined in operation S1002 that the single companion screen device 400 is available, the process proceeds to operation S1006 to establish a communication channel between the single companion screen device 400 and the client device 100, and the single companion screen device 400 may control the 360-degree video content.

When the client device 100 does not determine in operation S1002 that any available companion screen device 400 suitable for controlling the 360-degree content is present, the process proceeds to operation S1002a. This may occur when the client device 100 does not receive, from the companion screen device 400, any indication that the companion screen device 400 is capable of controlling the 360-degree video content. In operation S1002a, the 360-degree video content displayed on the client device 100 may be controlled by a general remote control device for controlling the client device 100. For example, when the client device 100 is a television, the remote control device may be a remote controller.

For example, there may be a plurality of compatible 'companion screen devices 400 connected to the same network as that of the client device 100. In operation S1002, when an indication that each of the companion screen devices 400 is capable of controlling the 360-degree video content is received from each of the companion screen devices 400, the process proceeds to operation S1003.

In operation S1003, the client device 100 may check a user configuration of the client device 100.

When the client device 100 permits multiple connections according to the checked user configuration, the process proceeds to operation S1003a to establish a communication channel between the client device 100 and each of the companion screen devices 400 indicating that the 360-degree control is possible. For example, the connections to the companion screen devices 400 may be used in a plurality of applications such as game applications.

When the companion screen devices 400 are available, the companion screen devices 400 may not all be in the same space as the client device 100. In this case, the user may be inconvenienced when the client device 100 automatically selects all the available companion screen devices 400 and starts the launcher application on all the available companion screen devices 400. This is especially true when devices that are not in the same room are selected. Therefore, one option to solve this problem is to display, on the client device 100, a pop-up that allows the user to select a specific device in operation S1003b of the present method. The user may select one specific companion screen device according to the displayed pop-up.

The client device 100 may be configured to automatically execute the launcher application on one of the companion screen devices 400. This may be executed by several methods.

In operation S1004, when the auto launch function is available, the client device 100 may be configured to determine whether the client device 100 is capable of checking the proximity of the available companion screen device 400. When the proximity checking is possible, operation S1004a is performed. In operation 1004a, the client device 100 may be configured to select the companion screen device 400 based on the proximity of the companion screen device 400 to the client device 100.

Proximity detection may be performed by using, for example, a BLE beacon. When selecting the companion screen device 400 based on physical proximity, the client device 100 may automatically select the companion screen device 400 that is physically closest to the client device 100.

When the user does not want to use proximity detection for a certain reason, the user may disable the proximity detection selection of the companion screen device 400 through a user interface option on the client device 100. As such, when the proximity detection selection is disabled or when the proximity checking is unusable for another reason, the process proceeds to operation S1005.

In operation S1005, the client device 100 may select the companion screen device 400 based on a learning algorithm.

An artificial Intelligence (AI) system is a computer system that implements human-level intelligence. Unlike an existing rule-based smart system, the AI system is a smart system in which a machine performs learning and determination by itself. As the use of the AI system is increased, a recognition rate of the AI system is improved and a user's preference may be understood more accurately. The existing rule-based smart system is gradually replaced with a deep learning-based AI system.

AI technology includes machine learning (deep learning) and element technologies using machine learning.

The machine learning is an algorithm technology for classifying and learning characteristics of input data by itself. The element technology is a technology for simulating functions such as a human brain's recognition or determination by using a machine learning algorithm such as deep learning. The element technology includes technical fields such as linguistic understanding, visual understanding, inference or prediction, knowledge representation, and motion control.

The client device 100 may be trained by using, for example, inference or prediction among various fields to which AI technology is applied. The inference or prediction is a technology for determining, logically inferring, and predicting information. The inference or prediction includes knowledge/probability-based inference, optimization prediction, preference-based planning, and recommendation. The client device 100 may select the companion screen device in a current situation using the process of selecting the companion screen device, which is previously performed by the client device 100, and the results.

When the client application first discovers a plurality of compatible launcher applications, the client application may display a pop-up to the user. The pop-up allows the user to select the preferred companion screen device 400 to which he or she wants to connect. As time passes, the client device 100 may learn the companion screen device 400 that is most connected to the client device 100 and may establish a communication channel with the companion screen device 400 that is used most. For example, the launcher application may be automatically started on the companion screen device 400 that is recognized as being most frequently connected to the client device 100.

For example, the client device 100 may store IDs of all the companion screen devices 400 previously connected to the client device 100. The client device 100 may record the time of this connection. When a plurality of devices are available, the client device 100 may select the companion screen device 400 based on a user profile that may be built over a certain period of time.

By selecting the companion screen device 400 based on the user profile, the client device 100 may prevent the content notification from being automatically transmitted to the user profile that is not compatible with the content. For example, the client device 100 may not select a child's user profile when 360-degree content regarding adult content is displayed on the client device 100. The user profile of the companion screen device 400 provides the related information to the client device 100 so as to prevent access to the client device 100 in the case of incompatible content. Also, a parental control may be set in the companion screen device 400 through, for example, the setting of the companion screen device 400. The companion screen device 400 may display the parental control on the client device 100, and the companion screen device 400 may be selected based on information about the parental control.

In operation S1006, since the communication channel is established between the selected companion screen device 400 and the client device 100, the 360-degree video content displayed on the client device 100 may be controlled by signals received by the companion screen device 400.

Figure 11:
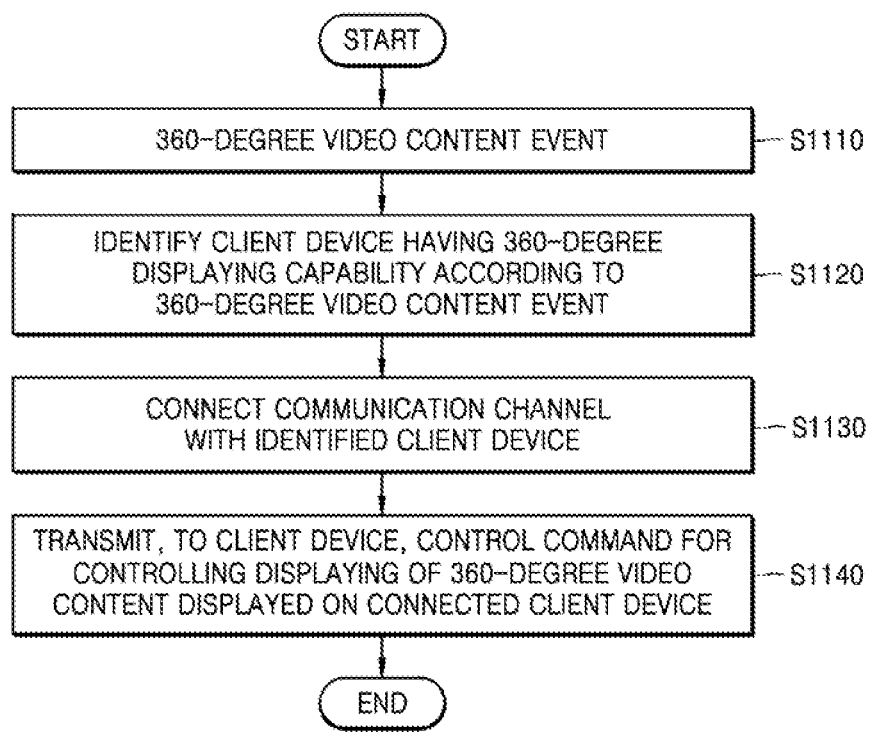
FIG. 11 is a flowchart describing an operation of the companion screen device 400 so as to establish a communication channel between the client device 100 and the companion screen device 400, according to an embodiment.

FIG. 11 is a flowchart describing an operation of the companion screen device 400 so as to establish the communication channel between the client device 100 and the companion screen device 400, according to an embodiment. According to an embodiment, all operations of the method may be performed by the same device, or some operations may be performed by different devices. All the operations illustrated in FIG. 11 may be performed by software or hardware according to a particular embodiment. When one or more operations are performed by software, a device for performing the method may include a processing unit including one or more processors, and a computer-readable memory that stores computer program commands for, when executed by the processing unit, performing the respective operations of the method.

In the present embodiment, the companion screen device 400 may initiate establishment of a communication channel between the client device 100 and the companion screen device 400. For example, the application that is executed on the companion screen device 400 may launch the 360-degree video client on the client device 100. For example, a companion screen application on the HbbTV may launch an HbbTV application.

In operation S1110, a 360-degree video content event may occur in the companion screen device 400.

In operation S1120, the companion screen device 400 is configured to search for the client devices 100. For example, the companion screen device 400 may be configured to search for the client devices 100 on the same IP network. Also, the companion screen device 400 may determine whether the client device 100 having a 360-degree support function is usable. When no suitable client device 100 is detected, the companion screen device 40 may display the 360-degree video content only on the display of the companion screen device 40.

In operation S1130, the companion screen device 400 may connect the communication channel to the identified client device.

The companion screen device 400 may use discovery and launch (DIAL) to discover the client device 100 and launch the 360-degree client application on the client device 100. For example, the client device 100 may notify the companion screen device 400 that the client device 100 has the 360-degree control function. The companion screen device 400 may be configured to request the launch of the client application on the client device 100 in response to the reception of the indication that the client device 100 has the 360-degree function.

For example, when the DIAL is used, the method may be implemented by extending an XML document returned from a URL resource as follows:

<? xml version="1.0"encoding="UTF-8"?
<xs: schema
xmlns: xs="http://www.w3.org/2001/XMLSchema"
xmlns="urn:hbbtv:CompanionScreen:2014"
targetNamespace="urn::CompanionScreen:2014"
elementFormDefault="qualified">
<xs: elementName="X_HbbTV_360Video"type="XS: string"/>
</xs: schema>

Alternatively, the user agent string may be extended to signal the 360-degree function as follows:

HbbTV/1.4.1 (+DRM, Samsung, SmartTV2017, SoftwareVersion;;)+MEDIA360 Chrome

However, the 360-degree function may be signaled by any suitable methods.

In operation S1140, the companion screen device 400 may enter a control mode in response to the launch of the client application on the client device 100. The companion screen device 400 causes the client device 100 to display the 360-degree content. Thereafter, the companion screen device 400 may transmit signals to the client device 100 so as to control the point of view of the 360-degree video content displayed on the client device 100.

Figure 12:
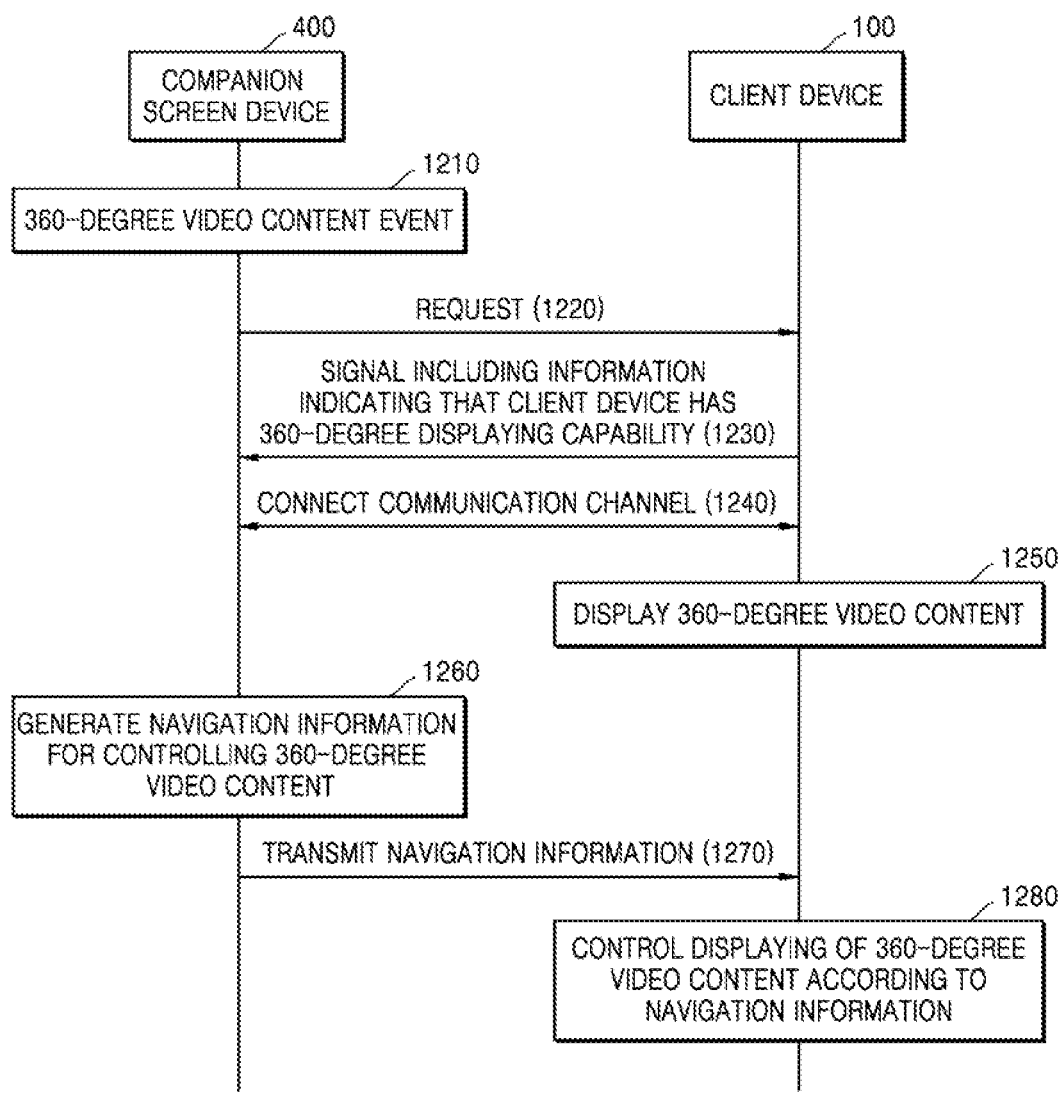
FIG. 12 illustrates an example of an operation by which the companion screen device 400 identifies the client device 100, according to an embodiment.

FIG. 12 illustrates an example of an operation by which the companion screen device 400 identifies the client device 100, according to an embodiment.

Referring to FIG. 12, in operation 1210, a 360-degree video content event may occur in the companion screen device 400. The 360-degree video content event may include any operation of triggering reproduction of 360-degree video content.

In operation 1220, the companion screen device 400 may transmit a discovery request signal so as to search for a client device capable of displaying the 360-degree video content.

In operation 1230, the client device 100 may transmit, to the companion screen device 400, a signal including information indicating that the client device 100 has a 360-degree displaying capability.

In operation 1240, the companion screen device 400 may identify the client device 100 by receiving, from the client device 100, the signal including the information indicating that the client device 100 has the 360-degree control capability. Therefore, a communication channel may be connected between the client device 100 and the companion screen device 400.

In operation 1250, the client device 100 may display the 360-degree video content. The client device 100 may acquire the 360-degree video content in various ways. For example, the client device 100 may receive the 360-degree video content directly from the server or through the companion screen device 400.

In operation 1260, the companion screen device 400 may generate navigation information for controlling the 360-degree video content. In operation 1270, the companion screen device 400 may transmit the generated navigation information to the client device 100.

In operation 1280, the client device 100 may control the displaying of the 360-degree video content according to the navigation information received from the companion screen device 400.

Figure 13:
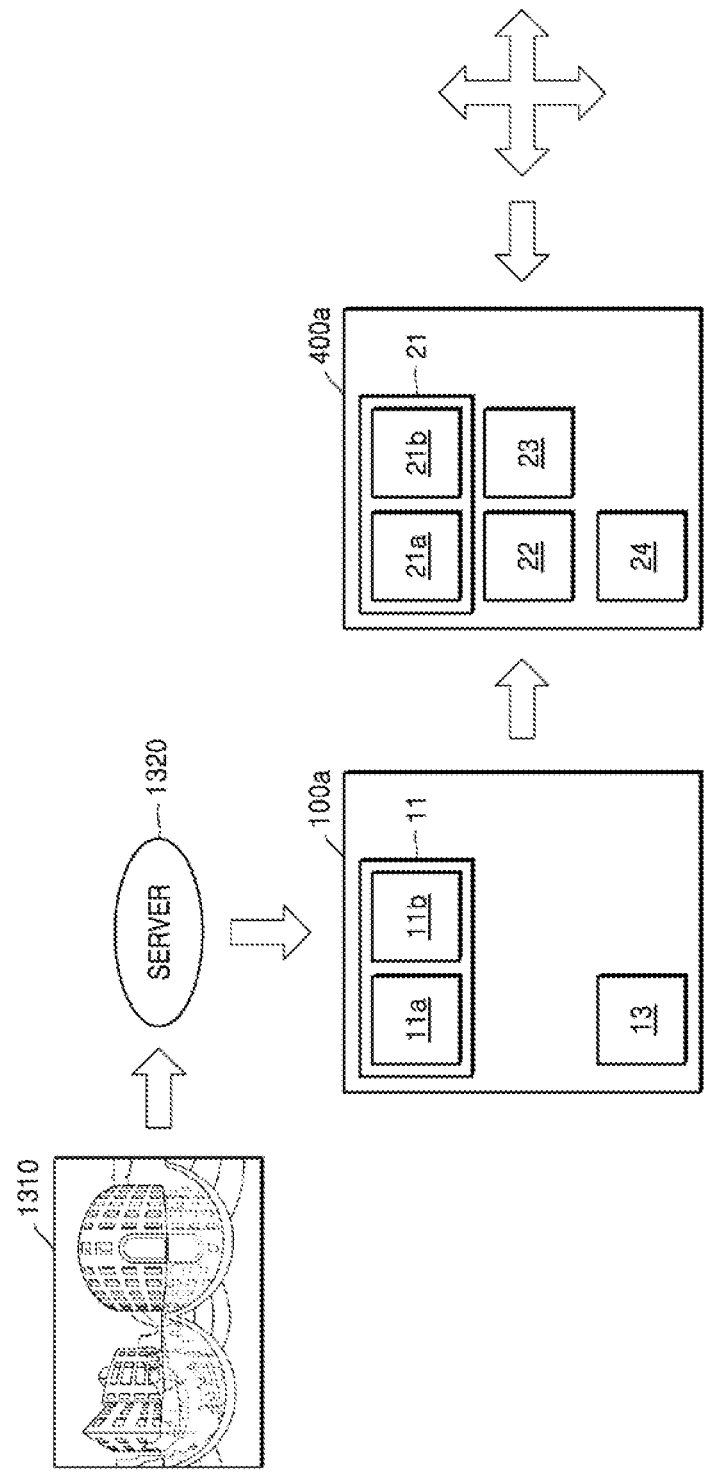
FIG. 13 is a schematic diagram of a client device 100a and a companion screen device 400a, according to an embodiment.

FIG. 13 is a schematic diagram of a client device 100a and a companion screen device 400a, according to an embodiment.

360-degree video content 1310 may be provided to the client device 100a such as a TV. The content 1310 may be uploaded to a server 1320 for transmission over a broadband or broadcast network. The content 1310 may be provided to the client device 100a that is executing a client application.

The client device 100a may cause the companion screen device 400a to launch the control application according to the method described above with reference to FIG. 4. The companion screen device 400a may receive a user command so as to control the point of view of the 360-degree video content 1310 displayed on the client device 100a. For example, the companion screen device 400a may include an inputter 24 such as a touch screen, and the user command may be input through the inputter. The inputter 24 may also include buttons for inputting commands. For example, the user command may include commands described in detail with reference to FIGS. 15 to 17.

The companion screen device 400a may include a processing unit 21 including a processor 21a, computer program code that may be stored in a memory 21b such as a non-transitory computer-readable memory. When executed by the processor 21a, the computer program code stored in the memory 21b may cause a device to perform the operations of the method described above with reference to FIGS. 11 and 12.

The client device 100a may include a processing unit 11 including a processor 11a, and computer program code that may be stored in a memory 11b such as a non-transitory computer-readable memory. When executed by the processor 11a, the computer program code stored in the memory 11b may cause a device to perform the operations of the method described above with reference to FIGS. 7 to 10. The companion screen device 400a may include sensors 22 so as to measure the orientation of the companion screen device. The companion screen device 400a may include a communication interface 23 so as to transmit and receive signals with the client device 100a. The client device 100a may include a communication interface 13 so as to transmit and receive signals with the companion screen device 400a.

Figure 14:
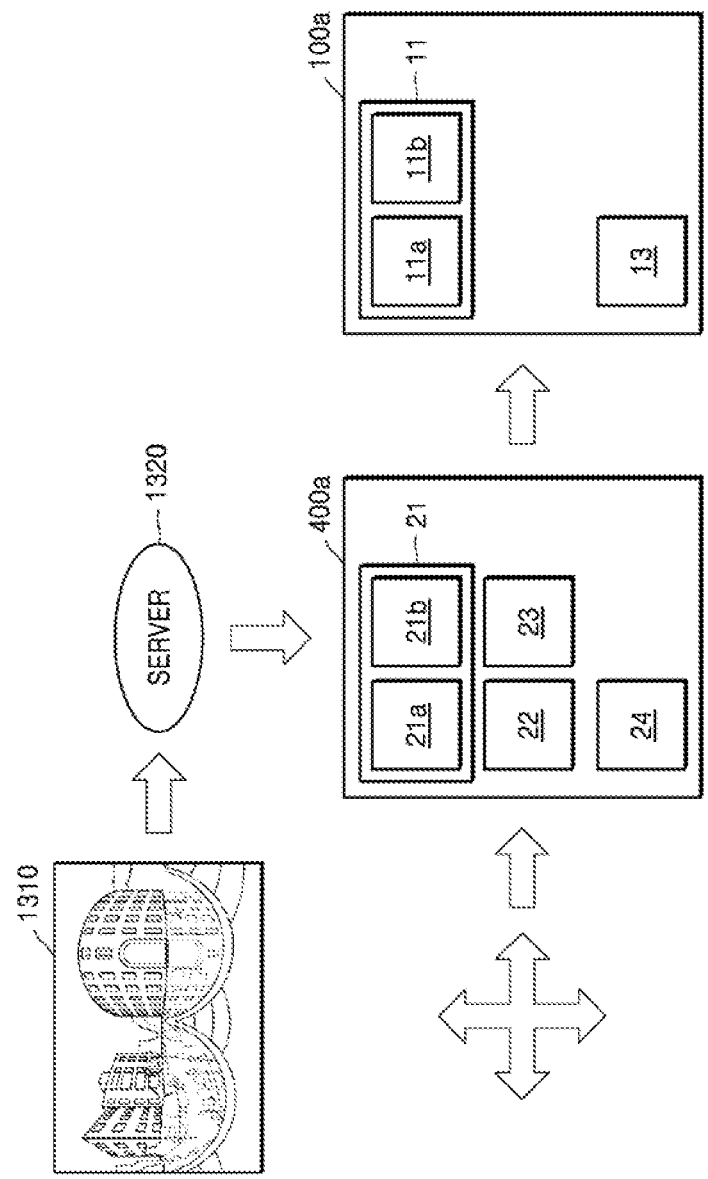
FIG. 14 is a schematic diagram of a client device 100a and a companion screen device 400a, according to an embodiment.

FIG. 14 is a schematic diagram of a client device 100a and a companion screen device 400a, according to an embodiment.

360-degree content 1310 is provided to the companion screen device 400a such as a mobile phone. The content 1310 may be provided to the companion screen device 400a from a server 1320 via a broadband or broadcast network. The companion screen device 400a may cause the client device 100a to execute a 360-degree application program according to the method described above with reference to FIG. 4. The user may provide a command for controlling the point of view of the 360-degree content 1310 displayed on the client device 100a through the companion screen device 400a. For example, the companion screen device 400a may include an inputter 24, such as a screen, through which a user command may be input. The inputter 24 may also include buttons through which commands may be input. For example, the user command may include commands described in detail with reference to FIGS. 15 to 17.

The companion screen device 400a may include a processing unit 21 including a processor 21a, and computer program code that may be stored in a memory 21b such as a non-transitory computer-readable memory. When executed by the processor 21a, the computer program code stored in the memory 21b may cause a device to perform the operations of the method described above with reference to FIGS. 11 and 12. The companion screen device 400a may include a sensor 22 so as to measure the orientation of the companion screen device. The companion screen device 400a may include a communication interface 23 so as to transmit and receive signals with the client device 100a.

The client device 100a may include a processing unit 11 including a processor 11a, and computer program code that may be stored in a memory 11b such as a non-transitory computer-readable memory. When executed by the processor 11a, the computer program code stored in the memory 11b may cause a device to perform the operations of the method described above with reference to FIGS. 7 to 10. The client device 100a may include a communication interface 13 so as to transmit and receive signals with the companion screen device 400a.

Figure 15:
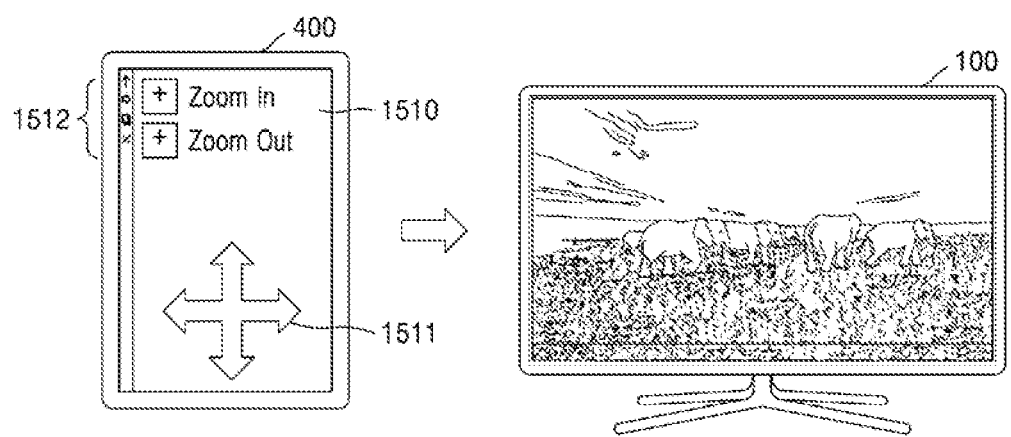
FIG. 15 is a schematic diagram of a control operation that may be performed by the companion screen device 400, according to an embodiment.

FIG. 15 is a schematic diagram of a control operation that may be performed by a companion screen device 400, according to an embodiment.

Referring to FIG. 15, the companion screen device 400 may display a user interface 1510. The user interface 1510 includes an icon corresponding to a search command that is selectable by a user. For example, the user interface 1510 may include a directional arrow 1511 that allows the user to scroll around content. The user may navigate the content in the horizontal and/or vertical direction by using the directional arrow 1511. Therefore, the point of view of the 360-degree video content may be adjusted according to a navigation command. For example, when the user selects a left arrow, the point of view of the 360-degree content may be rotated to the left.

The user interface 1510 may also include a zoom indicator 1512 that adjusts a zoom level of the content. Therefore, the user may watch a part of the content at a particular magnification. For example, when a viewing window of the client device 100 is a full screen of the client device 100, a content viewing window of the client device 100 may be kept constant such that an angular extent of displayed content is changed according to a zoom magnification. However, when the viewing window of the client device 100 is smaller than the full screen of the client device 100, the size of the viewing window may be changed according to the zoom level, such that the angular extent of the content is kept constant. The user interface 1510 may also allow the user to select different zoom modes (that is, different wide angle rendering modes). FIG. 18 illustrates another example of wide angle rendering that is selectable by the user.

Although not illustrated in FIG. 15, 360-degree video content may also be displayed on the companion screen device 400.

A navigation command that is selectable by the user may be transmitted to the client device 100 through signals. For example, the navigation command may be transmitted through a web socket to a client application that is executed on the client device 100.

The point of view of the 360-degree video content may be adjusted according to the navigation command in response to the signals received from the companion screen device 400.

Figure 16:
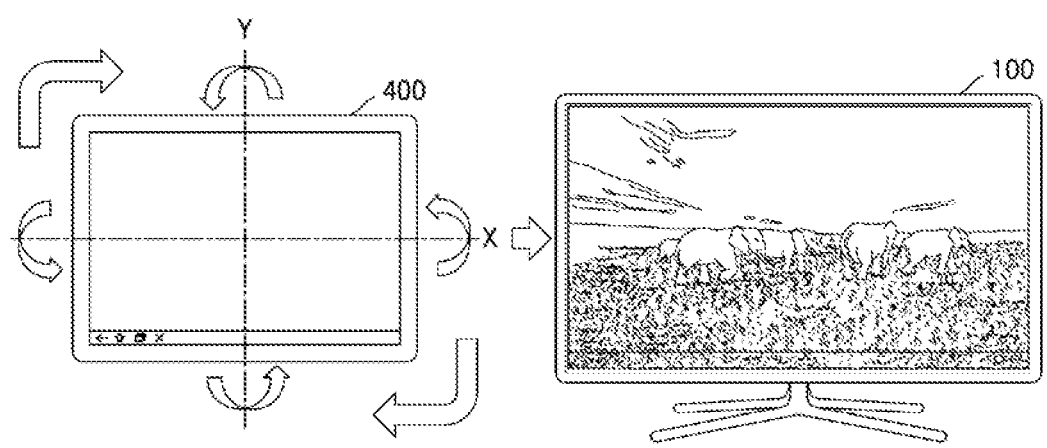
FIG. 16 is a schematic diagram of a control operation that may be performed by the companion screen device 400, according to an embodiment.

FIG. 16 is a schematic diagram of a control operation that may be performed by a companion screen device 400, according to an embodiment.

Referring to FIG. 16, the companion screen device 400 may be configured to transmit orientation information to a client device 100 through signals. For example, the companion screen device 400 may be rotated about x-axis, y-axis, and/or z-axis. The companion screen device 400 may include at least one sensor configured to detect the orientation of the device or a change in the orientation of the device. The companion screen device 400 may transmit, to the client device 100, a value corresponding to the orientation of the device. For example, X, Y, and Z rotation vectors may be read by the sensor of the companion screen device 400.

An orientation value may be transmitted to a client application through a web socket. There may be a dedicated web socket connection between the companion screen device 400 and the client device 100. Some throttling of data transmitted from the companion screen device 400 to the client device 100 may be necessary for preventing the data from being overloaded into the web socket.

For example, the client device 100 is configured to adjust the point of view of the 360-degree content in response to the reception of the device orientation information about the companion screen device 400, such that the point of view of the 360-degree video content displayed by the client device 100 is rotated based on the orientation of the companion screen device 400.

The client device 100 may interpret received position data in a manner that is best suitable for providing improved experiences to the user. For example, when the client device receives absolute positions defined by the companion screen device 400, the client device may rapidly jump to the positions. However, this becomes a "rapid" user experience due to a rapid change in a point of view during reproduction of 360-degree content. Alternatively, the client application may apply some smoothing logics to smoothly transition 360-degree navigation to a final position received from the companion screen device 400 at a constant speed. For example, smoothed orientation data may be acquired by smoothing the orientation value. The smoothing may include changing values so as to have equal intervals over the range of the received values. A rotation speed of the point of view of the 360-degree video content may be determined based on smoothed orientation data.

Figure 17:
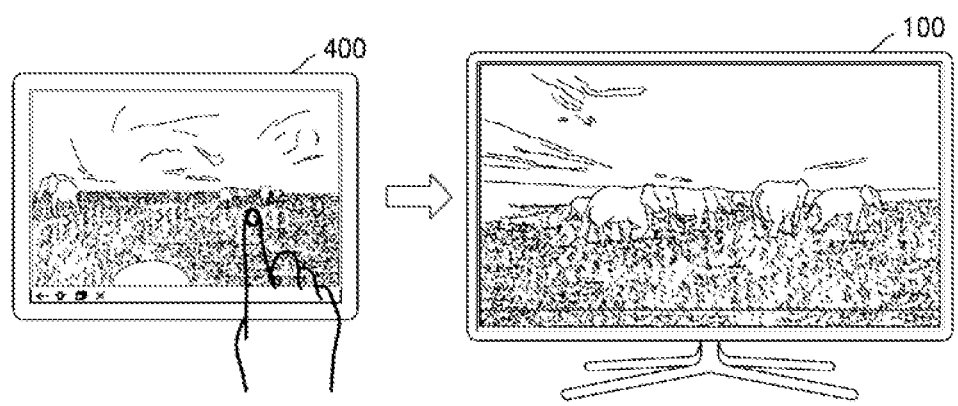
FIG. 17 is a schematic diagram of a control operation that may be performed by the companion screen device 400, according to an embodiment.

FIG. 17 is a schematic diagram of a control operation that may be performed by a companion screen device 400, according to an embodiment.

In some embodiments, the companion screen device 400 may be configured to display 360-degree video content synchronized with content displayed on a client device 100. The companion screen device 400 may mirror, to the companion screen device 400, video content displayed on the client device 100. Various mirroring technologies may include, for example, screen mirroring, Digital Living Network Alliance (DLNA), Bluetooth, Miracast, Wi-Fi Direct, Digital Mobile Radio (DMR), and the like. Alternatively, the entire 360-degree content is rendered to the full screen on the companion screen device 400, such that the user may watch the entire frame of video through the screen of the companion screen device 400. That is, it is possible to watch the entire field of view of the 360-degree content on the companion screen device 400. The user may point to the video area on the screen of the companion screen device 400. The client device 100 is configured to control the point of view of the 360-degree video in response to the reception of the signals pointing to the area of the video content, and the portion of the 360-degree video displayed on the client device 100 may include the pointed area.

Also, the user may zoom in or out the content in response to the indication received on the screen when the companion screen device 400 displays the entire field of view. For example, the user may use two fingers to pinch on or off or tap the screen so as to zoom in or out the content displayed on the client device 100.

As in the embodiment illustrated in FIG. 17, the 360-degree images are displayed on the client device 100 and the companion screen device 400 by using mirroring technology. The client device 100 displays an image corresponding to a certain area of the 360-degree image, and the companion screen device 400 displays a wider range of the 360-degree image. Therefore, the user may watch a wider range of an area from the image displayed on the companion screen device 400. Also, this may be used to more easily control the point of view of the 360-degree image.

FIG. 18 illustrates different wide angle modes that may be selected by the client device 100 so as to render 360-degree video content, according to an embodiment.

Zooming of 360-degree video may cause distortion of video. Therefore, according to the present disclosure, the user may be allowed to control the wide angle view so that the user selects different views by using the companion screen device 400. The wide angle rendering mode that is selectable in the companion screen device 400 includes fisheye stereo graphic illustrated in 1800*a*, fisheye equisolid illustrated in 1800*b*, fisheye equidistant illustrated in 1800*c*, and fisheye orthographic illustrated in 1800*d*, but is not limited thereto.

The method of operating the client device and the companion screen device, according to embodiments, may be implemented in the form of program commands that are executable by various computer devices and may be recorded in a computer-readable recording medium. Examples of the computer-readable recording medium may include program commands, data files, and data structures solely or in combination. The program commands recorded in the computer-readable recording medium may be specially designed and configured for the present disclosure, or may be well known to and usable by those of ordinary skill in the field of computer software. Examples of the computer-readable recording medium may include magnetic media (e.g., hard disk, floppy disk, magnetic tape, etc.), optical media (e.g., compact disc-read-only memory (CD-ROM), digital versatile disc (DVD), etc.), magneto-optical media (e.g., floptical disk, etc.), and hardware devices (e.g., ROM, RAM, flash memory, etc.) specially configured to store and execute program commands. Examples of the program commands may include not only machine language codes produced by a compiler but also high-level language codes executable by a computer using an interpreter or the like.

While one or more embodiments of the present disclosure have been described in detail, it will be understood by those of ordinary skill in the art that the scope of the present disclosure is not limited thereto and various changes and modifications may be made therein without departing from the scope as defined by the following claims.

The invention claimed is:

1. A client device comprising:
   a communication interface;
   a display;
   a memory configured to store one or more instructions; and
   a processor configured to execute the one or more instructions stored in the memory to:
      control the display to display at least a part of 360-degree video content according to an angle of view;
      identify at least one companion screen device of a plurality of companion screen devices having a 360-degree control capability to change the angle of view in order to perform 360-degree control on the 360-degree video content, the at least one companion screen device being identified by receiving, from the plurality of companion screen devices, a signal including information indicating that the plurality of companion screen devices have the 360-degree control capability and by selecting the at least one companion screen device of the plurality of companion screen devices;
      control the communication interface to connect a communication channel with the selected at least one companion screen device; and
      control the display to control displaying of the 360-degree video content according to a changed angle of view based on a control command received from the connected at least one companion screen device.

2. The client device of claim 1, wherein the processor is further configured to execute the one or more instructions to request the selected at least one companion screen device to execute an application that performs a control operation of displaying the 360-degree video content.

3. The client device of claim 1, wherein the processor is further configured to execute the one or more instructions to
   transmit a request signal for discovering the at least one companion screen device, and
   receiving, from the at least one companion screen device, a signal including information indicating that the at least one companion screen device has the 360-degree control capability.

4. The client device of claim 1, wherein the processor is further configured to execute the one or more instructions to select the at least one companion screen device among the plurality of companion screen devices based on a user profile associated with the at least one companion screen device.

5. The client device of claim 1, wherein the processor is further configured to execute the one or more instructions to select the at least one companion screen device among the plurality of companion screen devices based on a proximity of the client device to each of the plurality of companion screen devices.

6. The client device of claim 1, wherein the processor is further configured to execute the one or more instructions to select the at least one companion screen device among the plurality of companion screen devices based on a learning algorithm.

7. The client device of claim 1, wherein the processor is further configured to execute the one or more instructions to
   receive device orientation information about a changed orientation of the at least one companion screen device through the communication channel,
   adjust a point of view of the displayed 360-degree video content in response to the device orientation information such that the point of view of the displayed 360-degree video content is rotated on a sphere, on which the 360-degree video content is mapped, according to the changed orientation of the at least one companion screen device, and
   control the display to display an area of the 360-degree video content corresponding to the adjusted point of view.

8. The client device of claim 7, wherein the device orientation information includes a plurality of orientation values measured by one or more sensors arranged to detect the changed orientation of the at least one companion screen device, and
   the processor is further configured to execute the one or more instructions to
   smooth the plurality of orientation values so as to acquire smoothed orientation data, and
   determine a rotation speed of the point of view of the 360-degree video content based on the smoothed orientation data.

9. A companion screen device comprising:
   a communication interface;
   a display;
   a memory configured to store one or more instructions; and
   a processor configured to execute the one or more instructions stored in the memory to:
      receive a request from a client device, which displays at least a part of 360-degree video content according to an angle of view;
      based on receiving the request from the client device, transmit a signal including information indicating that the companion screen device has a 360-degree control capability to change the angle of view in order to perform 360-degree control on the 360-degree video content;
control the communication interface to connect a communication channel with the client device; and
control the communication interface to transmit, to the client device, a control command to change the angle of view of the 360-degree video content, for controlling displaying of the 360-degree video content according to the changed angle of view on the connected client device.

10. The companion screen device of claim 9, wherein the processor is further configured to execute the one or more instructions to identify the client device by receiving, from the client device, a signal including information indicating that the client device has a 360-degree video content-displaying capability.

11. The companion screen device of claim 9, wherein the processor is further configured to execute the one or more instructions to
detect a changed orientation of the companion screen device; and
transmit device orientation information about the changed orientation of the companion screen device to the client device via the communication channel such that a point of view of the 360-degree video content displayed on the client device is rotated on a sphere, on which the 360-degree video content is mapped, according to the changed orientation of the companion screen device.

12. A method of operating a client device, the method comprising:
displaying at least a part of 360-degree video content according to an angle of view;
identifying at least one companion screen device of a plurality of companion screen devices having a 360-degree control capability to change the angle of view in order to perform 360-degree control on the 360-degree video content, the identifying being based on receiving, from the plurality of companion screen devices, a signal including information indicating that the plurality of companion screen devices have the 360-degree control capability and selecting the at least one companion screen device of the plurality of companion screen devices;
connecting a communication channel with the selected at least one companion screen device; and
controlling displaying of the 360-degree video content according to a changed angle of view based on a control command received from the connected at least one companion screen device.

13. A method of operating a companion screen device, the method comprising:
receiving a request from a client device, which displays at least a part of 360-degree video content according to an angle of view;
based on receiving the request from the client device, transmitting a signal including information indicating that the companion screen device has a 360-degree control capability to change the angle of view in order to perform 360-degree control on the 360-degree video content;
connecting a communication channel with the client device; and
transmitting, to the client device, a control command to change the angle of view of the 360-degree video content, for controlling displaying of the 360-degree video content according to the changed angle of view on the connected client device.

14. A computer program product comprising a non-transitory computer-readable recording medium having recorded thereon one or more programs for performing a method of operating a client device, the method comprising:
displaying at least a part of 360-degree video content according to an angle of view;
identifying at least one companion screen device of a plurality of companion screen devices having a 360-degree control capability to change the angle of view in order to perform 360-degree control on the 360-degree video content, the at least one companion screen device being identified by receiving, from the plurality of companion screen devices, a signal including information indicating that the plurality of companion screen devices have the 360-degree control capability and by selecting the at least one companion screen device of the plurality of companion screen devices;
connecting a communication channel with the selected at least one companion screen device; and
controlling displaying of the 360-degree video content according to a changed angle of view based on a control command received from the connected at least one companion screen device.

* * * * *